US007021357B2

(12) United States Patent
Katano et al.

(10) Patent No.: US 7,021,357 B2

(45) Date of Patent: Apr. 4, 2006

(54) COMPONENT MOUNTING APPARATUS AND COMPONENT MOUNTING METHOD

(75) Inventors: Ryoichiro Katano, Hirakata (JP); Shinjiro Tsuji, Nara (JP); Shinji Kanayama, Kashihara (JP); Masahiko Ikeya, Sakai (JP); Yasutaka Tsuboi, Hirakata (JP); Akimitsu Mukai, Katano (JP); Yasuhiro Noma, Yao (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 236 days.

(21) Appl. No.: 10/234,118

(22) Filed: Sep. 5, 2002

(65) Prior Publication Data

US 2003/0070280 A1 Apr. 17, 2003

(30) Foreign Application Priority Data

Sep. 6, 2001 (JP) ............................ 2001-270390

(51) Int. Cl.
*B29C 65/00* (2006.01)

(52) U.S. Cl. ........................................ 156/556; 29/740

(58) Field of Classification Search ................ 156/538, 156/556, 566, 562, 559, 382; 29/740, 832, 29/743; 269/21, 903

See application file for complete search history.

(56) References Cited

U.S. PATENT DOCUMENTS 3,646,656 A * 3/1972 Zilahy et al. ................ 29/790
5,414,617 A * 5/1995 Pomerleau et al. ........... 700/11
5,932,065 A * 8/1999 Mitchell ..................... 156/556
6,446,948 B1 * 9/2002 Allen .......................... 269/21
6,612,546 B1 * 9/2003 Young et al. ............... 251/195
6,618,937 B1 * 9/2003 Onitsuka ..................... 29/832

FOREIGN PATENT DOCUMENTS

JP 03158310 A * 7/1991
JP 2001210999 A * 8/2001

OTHER PUBLICATIONS

English abstract for JP 03158310.*
Machine translation for JP 2001210999.*
english abstract for JP 2001210999.*

* cited by examiner

*Primary Examiner*—Jeff H. Aftergut
*Assistant Examiner*—John L. Goff
(74) *Attorney, Agent, or Firm*—Wenderoth, Lind & Ponack, L.L.P.

(57) ABSTRACT

A component-mounting apparatus is provided with a pallet-carrying unit that carries a pallet, holding boards, within the apparatus. The pallet-carrying unit carries the pallet to a loading unit for feeding boards to the pallet, an ACF applying unit for applying an ACF tape onto the boards, a pre-press bonding unit for positioning components relative to the boards and bonding the components with a first pressing force, a final bonding unit for bonding the components to the boards with a second pressing force larger than the first pressing force so as to fix the components onto the boards, and an unloading unit for removing the boards, with the components mounted thereon, from the pallet. Then, the pallet-carrying unit returns the pallet from the unloading unit to the loading unit.

8 Claims, 27 Drawing Sheets

COMPONENT MOUNTING APPARATUS AND COMPONENT MOUNTING METHOD

BACKGROUND OF THE INVENTION

The present invention relates to a component mounting apparatus and a component-mounting process for mounting electronic components such as IC chips and a variety of semiconductor devices, and components including flexible printed boards (or FPC boards) onto a glass board such as a liquid crystal display board (LCD board) or a plasma display panel board (or PDP board), or a board including a FPC board.

As conventional component mounting apparatuses of this type, what are called line types and rotary types are known.

In the line type component mounting apparatus, a carry-in unit for carrying a board into the apparatus, an ACF applying section for applying an anisotropic conductive tape onto the board, a pre-press bonding section for preliminarily bonding a component onto the board, a final press bonding section for substantially bonding the component onto the board, and a carry-out unit for carrying out the board, with the component mounted thereon, from the apparatus to an exterior of the apparatus are arranged alongside a practically straight line. Carry arms are arranged between each of the above units, respectively. Each of these carry arms moves along the line, supporting an underside of the board, and sends the board to the carry arm on a downstream side. The board is sent from one carry arm to the next carry arm one after another so as to be carried from the carry-in unit to the carry-out unit via the ACF applying section, the pre-press bonding section and the final press bonding section.

On the other hand, the rotary type component mounting apparatus comprises an index stage which intermittently rotates while sucking and holding a board. On a periphery of the index stage, a carry-in and -out unit for carrying a board into and out of the apparatus, an ACF applying section, a pre-press bonding section and a final press bonding section are arranged along a direction of rotation. The board being sucked and held by the index stage is carried from the carry-in and -out unit, to the ACF applying section, the pre-press bonding section and the final press bonding section in this order, and is returned to the carry-in and -out unit after the index stage has rotated once.

The line type component mounting apparatus has a problem in that the board is subject to damage since a load acts on the board when one carry arm receives the board from a previous carry arm. For example, in case of a glass board such as a liquid crystal display board (LCD board), a plasma display panel board (PDP board) or the like, there is a danger of the board cracking because of a load which acts on the board when the board is received by a subsequent carry arm. Particularly, a large and heavy PDP board is subject to damage because of such a load as above. On the other hand, in case of a flexible printed board (FPC board), the board bends under a load acting thereon when the board is received by the subsequent carry arm, and thus, there is a danger of disconnection of a conductive part.

In the meantime, in a case of the rotary type component mounting apparatus, a board is carried while being held by the index stage, and thus, a load acting on the board is relatively small. However, workability for maintenance becomes poor, because an operator must repeat motions for maintenance around the apparatus, differently from the line type apparatus in which respective units are linearly arranged. The rotary type component mounting apparatus has another problem in terms of its large equipment size, as compared with the line type apparatus, which is to mount components on boards of the same size.

In addition, either of the line type component mounting apparatus and the rotary type component mounting apparatus requires intricate setting and adjustment when any change in a size and type of boards is needed, so that an operator is compelled to work for such setting and adjustment for a relatively long time.

Under the foregoing circumstances, an object of the present invention is to provide a component mounting apparatus and a component-mounting process which make it possible to mount components at higher tact on various types of boards with different sizes without causing any damage to the boards. Another object of the present invention is to provide an improvement in terms of workability for maintenance and flexibility with regard to a change in the type and size of boards.

SUMMARY OF THE INVENTION

The first aspect of the invention provides a component mounting apparatus for mounting a component onto a board, comprising: a pallet for holding the board; and a pallet carrying section for carrying the pallet in the apparatus.

In the component mounting apparatus according to the first aspect, the board is carried while being held by the pallet. Therefore, a load applied on the board being carried is reduced to thereby prevent damage to the board.

Specifically, the above component mounting apparatus comprises a loading section for feeding the board to the pallet, an adhesive applying section for applying adhesive onto the board, a pre-press bonding section for aligning a component with the board and pressing the component onto to the board with a first pressing force, a final press bonding section for pressing the component onto a placement section of the board with a second pressing force larger than the first pressing force, thereby fixing the component onto the placement section of the board, and an unloading section for removing the board with the component mounted thereon from the pallet. The pallet carrying section carries the pallet from the loading section to the adhesive applying section, the pre-press bonding section, the final press bonding section, and the unloading section in this order, and returns the pallet from the unloading section to the loading section.

Since the board being held by the pallet is carried to the loading section, the adhesive applying section, the pre-press bonding section, the final press bonding section and the unloading section in this order, a load which acts on the board is reduced, thereby preventing possible damage to the board which would be caused during a course of carrying the board. Further, since the board is held by the pallet, time required for recognizing the board in each of the adhesive applying section, the pre-press bonding section and the final press bonding section can be reduced or eliminated, thereby improving tact. Furthermore, use of a pallet suitable for a type and shape of the board makes it possible to adopt to a change of the type of a board, and therefore, time required for changing the type of the board can be reduced.

More specifically, the loading section, the adhesive applying section, the pre-press bonding section, the final press bonding section, and the unloading section are arranged on one straight line. Therefore, an operator needs not to repeatedly move around the apparatus for maintenance or the like, and therefore workability is improved.

The pallet carrying section comprises a forward carrying section for carrying the pallet from the loading section to the unloading section via the adhesive applying section, the pre-press bonding section, and the final press bonding section, and a backward carrying section for returning the pallet from the unloading section to the loading section.

Further, the forward carrying section of the pallet carrying section comprises a first intermediate stage arranged between the adhesive applying section and the pre-press bonding section, a second intermediate stage arranged between the pre-press bonding section and the final press bonding section, a first carrying mechanism for carrying the pallet from the loading section to the first intermediate stage via the adhesive applying section, and placing the pallet on the first intermediate stage, a second carrying mechanism for carrying the pallet from the first intermediate stage to the second intermediate stage via the pre-press bonding section, and placing the pallet on the second intermediate stage, and a third carrying mechanism for carrying the pallet from the second intermediate stage to the unloading section via the final press bonding section.

The pallet may be capable of sucking and holding the board or mechanically chucking the board.

In a case of sucking and holding the board, the pallet preferably comprises a pallet body provided with suction holes for sucking and holding the board, first and second suction ports, and an exhaust port communicating with air, formed therein, and which receives the board at an upper side thereof. The pallet also has a valve unit for allowing the suction holes to communicate with the first and second suction ports, or the exhaust port.

Further, in a case of using a pallet of this type, it is preferable that the loading section is provided with a first switching mechanism for switching the valve unit so as to allow the suction holes to communicate with the first and second suction ports, the first and second intermediate stages are respectively provided with sucking mechanisms for sucking and holding the pallet, and suction sources to be connected to the first suction port of the pallet body, and the first, second, and third carrying mechanisms are respectively provided with suction mechanisms for sucking and holding the pallet. The loading section is also provided with suction sources to be connected to the second suction port of the pallet body, and the unloading section is provided with a second switching mechanism for switching the valve unit so as to allow the suction ports to communicate with the exhaust port.

It is also preferable that the pallet body is provided with a check valve arranged between the first and second suction ports and the suction hole, with this check valve only permitting air to flow from the suction hole to the suction ports.

Specifically, the loading section preferably comprises a loading stage on which the pallet is placed, and a board carry-in mechanism for carrying the board from outside of the apparatus onto the pallet on the loading stage.

Further, it is preferable that the loading stage comprises a sucking mechanism for sucking and holding the pallet, and a suction source to be connected to the first suction port of the pallet body.

Furthermore, the board carry-in mechanism comprises a carry-in slider for carrying the board into the apparatus from outside of the apparatus, and a loader for transferring the board from the carry-in slider to the pallet on the loading stage.

Specifically, the unloading section comprises a unloading stage on which the pallet is placed, and a board carry-out mechanism for carrying out the board from the pallet on the unloading stage to outside of the apparatus.

Further, it is preferable that the unloading stage comprises a suction mechanism for sucking and holding the pallet, and a suction source to be connected to the first suction port of the pallet body.

Furthermore, it is preferable that the board carry-out mechanism comprises a carry-out slider for carrying the board out from the apparatus, and an unloader for transferring the board from the pallet on the unloading stage to the carry-out slider.

Specifically, the backward carrying section of the pallet carrying section is adapted to carry the pallet from the unloading stage to the loading stage and place the pallet on the loading stage.

A second aspect of the second invention provides a component mounting method for mounting a component onto a board, comprising: causing a pallet to hold a board; carrying the pallet to an adhesive applying section; applying adhesive to the board in the adhesive applying section; carrying the pallet from the adhesive applying section to a pre-press bonding section; aligning a component with a placement section of the board and pressing the component onto the board with a first pressing force in the pre-press bonding section; carrying the pallet from the pre-press bonding section to a final press bonding section; pressing the component onto the placement section of the board with a second pressing force larger than the first pressing force in the final press bonding section; and removing the board, with the component mounted thereon, from the pallet.

According to the method of the second aspect, the board is carried while being held by the pallet, and therefore a load acting on the board during the course of carrying is reduced, so that damage to the board is prevented.

Specifically, after the board with the component mounted thereon has been removed from the pallet, the pallet is returned to the adhesive applying section.

BRIEF DESCRIPTION OF THE DRAWINGS

Other features and objects of the present invention will be understood from the following description on preferred embodiments of the invention with reference to the accompanying drawings.

DETAILED DESCRIPTION OF THE PREFERRED EMBODIMENTS

Figure 1:
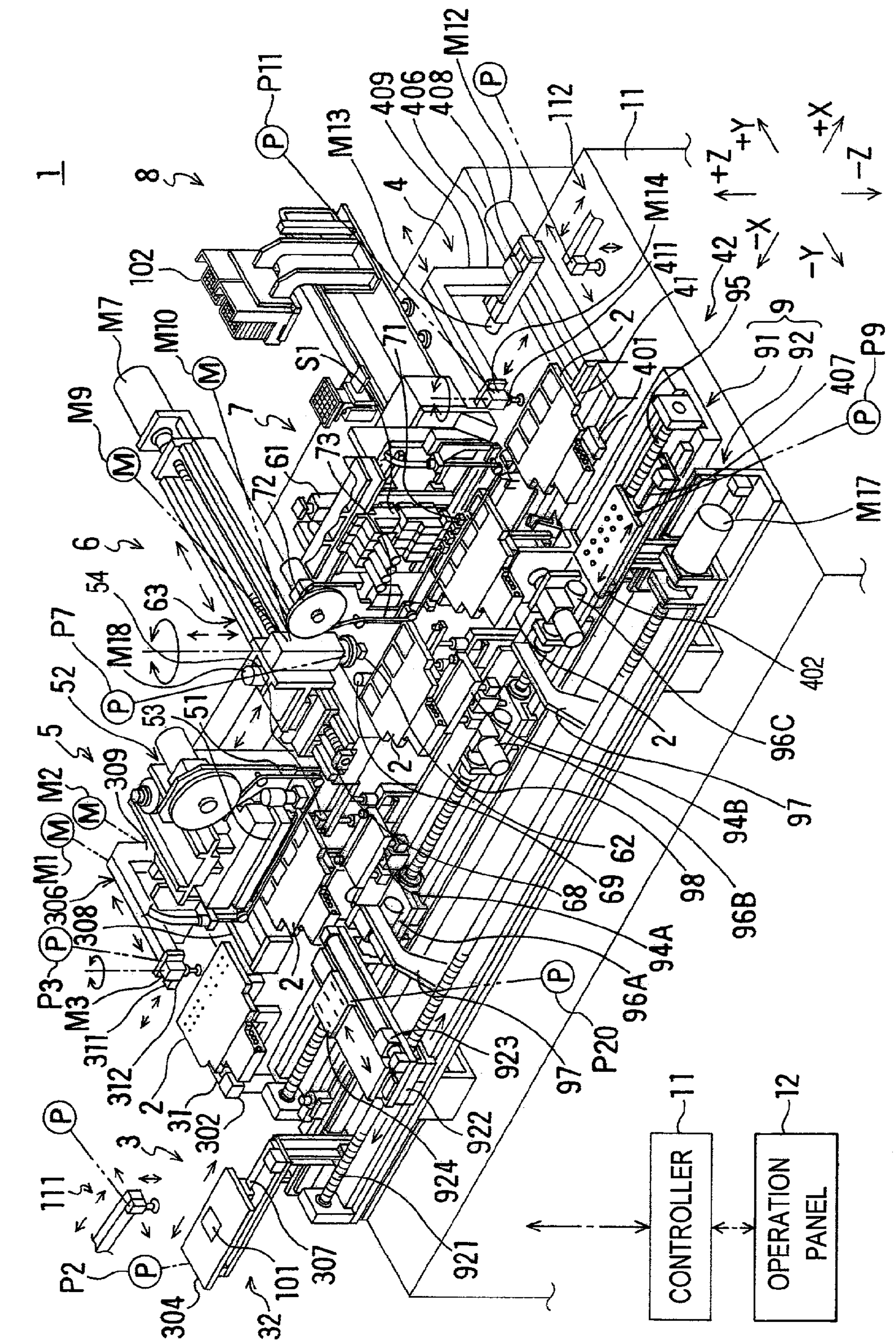
FIG. 1 is a perspective view of a component mounting apparatus according to an embodiment of the present invention.

Embodiments of the present invention shown in the drawings will be described in detail.

A component mounting apparatus 1 according to an embodiment of the present invention shown in FIG. 1 is to mount components onto boards. As will be described later, there is no particular limit in terms of selection of boards and components to be mounted by the component mounting apparatus 1. However, this embodiment employs a liquid crystal display board (LCD board) 101 as a board and an IC chip as component 102. In this component mounting apparatus 1, each of five pallets 2 sucks and holds four LCD boards 101, and each of the pallets 2 is carried or circulated in the apparatus, instead of using mechanisms such as carrying arms or the like which receive and carry LCD boards 101.

In the component mounting apparatus 1, between a loading section 3 for feeding an LCD board 101 onto the pallet 2 and an unloading section 4 for removing the board 101 with an IC chip 102 mounted thereon from pallet 2, an ACF applying section 5, a pre-press bonding section 6, and a final press bonding section 7 are arranged. These sections are arranged on one straight line (extending along an X-axial direction in FIG. 1). The component mounting apparatus 1 further comprises an IC chip feeding section (component feeding section) 8 for feeding IC chip 102 to the pre-press bonding section 6.

Further, the component mounting apparatus 1 is provided with a pallet carrying section 9 which carries pallet 2 from loading section 3 to the ACF applying section 5, the pre-press bonding section 6, the final press bonding section 7 and the unloading section 4 in this order, and returns the pallet 2 from the unloading section 4 to the loading section 3.

Furthermore, the component mounting apparatus 1 is provided with a controller 11 electrically connected to actuators such as motors, air cylinders and the like. The controller 11 controls the actuators provided in the component mounting apparatus 1 according to instructions inputted from recognition cameras, a variety of sensors, and an operation panel 12.

Pallet 2 is described with reference to FIGS. 2 and 3.

Each pallet 2 comprises a pallet body 21 made of a resin for sucking and holding the LCD boards 101 at its upper surface 21*a*, and a valve unit 22 provided on a proximal end of the pallet body 21.

The pallet body 21 is provided with four sucking sections 23A, 23B, 23C and 23D at its distal end portion. Each of the sucking sections 23A to 23D has a plurality of suction holes 24 which open to the upper surface 21*a* of the pallet body 21. The sucking sections 23A to 23D are respectively provided with four suction passages 26*a*, 26*b*, 26*c* and 26*d* separated from one another. Distal ends of the suction passages 26*a* to 26*d* are respectively connected to the suction holes 24 of corresponding sucking sections 23A to 23D, and proximal ends of the suction passages 26*a* to 26*d* are respectively connected to the valve unit 22.

An underside 21*b* of the pallet body 21 is formed with first and second suction ports 27A and 27B. The first suction port 27A has a function of connecting the suction holes 24 to suction mechanisms provided in a loading stage 31, first and second intermediate stages 94A and 94B, and an unloading stage 41 which will be described later. On the other hand, the second suction port 27B has a function of connecting the suction holes 24 to suction mechanisms provided in first to third carrying mechanisms 96A, 96B and 96C. One end of each of suction passages 28*a* and 28*b* is respectively connected to the first and second suction ports 27A and 27B. Another end of each of the passages 28*a* and 28*b* is connected to the valve unit 22.

The underside 21*b* of the pallet body 21 further has an exhaust port 29 opened to air. An exhaust passage 201 is connected to the exhaust port 29 at its one end and the valve unit 22 at its other end.

The valve unit 22 is provided with three-ports two-positions type mechanical valves 202A, 202B, 202C and 202D respectively corresponding to the sucking sections 23A to 23D.

First ports 202*a* of the mechanical valves 202A to 202D are connected to the suction holes 24 of a corresponding one of the sucking sections 23A to 23D via a corresponding one of passages 203*a*, 203*b*, 203*c* and 203*d* in the valve unit 22 and a corresponding one of suction passages 26*a* to 26*d* in the pallet body 21.

Second ports 202*b* of mechanical valves 202A to 202D are respectively connected to the first and second ports 27A and 27B via suction passage 203, passages 204*a* and 204*b* branched from the suction passage 203, and the suction passages 28*a* and 28*b* in the pallet body 21.

The suction passages 28*a* and 28*b* are respectively provided with check valves 205A and 205B. The check valve 205A permits air to flow into the first suction port 27A from the suction holes 24 of each of the sucking sections 23A to 23D, while preventing air flow in an opposite direction. Similarly, the check valve 205B permits air to flow only into the second suction port 27B from the suction holes 24 of each of the sucking sections 23A to 23D.

Third port 202*c* of each of the mechanical valves 202A to 202D is connected to the exhaust valve 29 via the exhaust passage 206 in the valve unit and the exhaust passage 201 in the pallet body 21.

Figure 2:
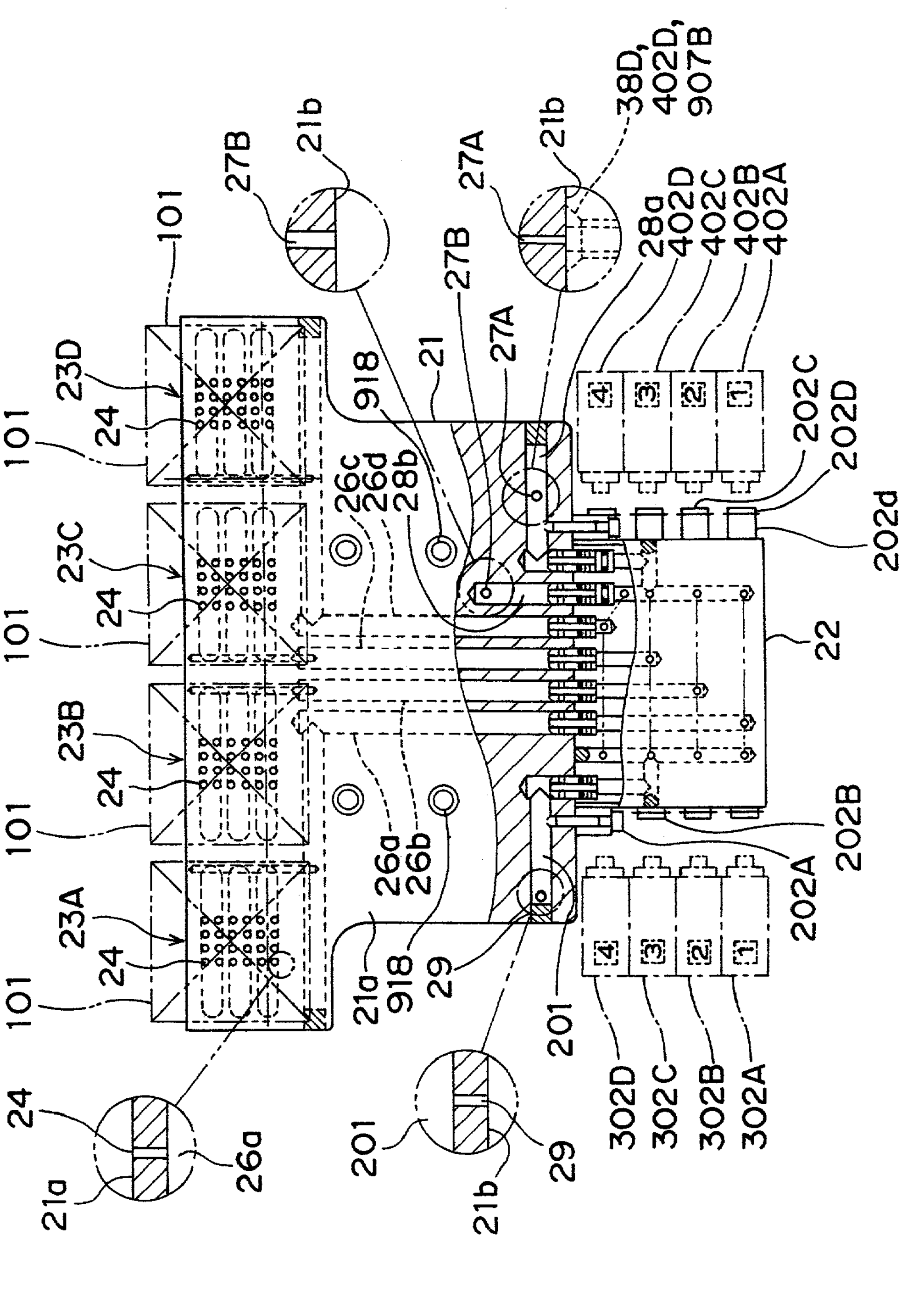
FIG. 2 is a plan view of a pallet.
Figure 3:
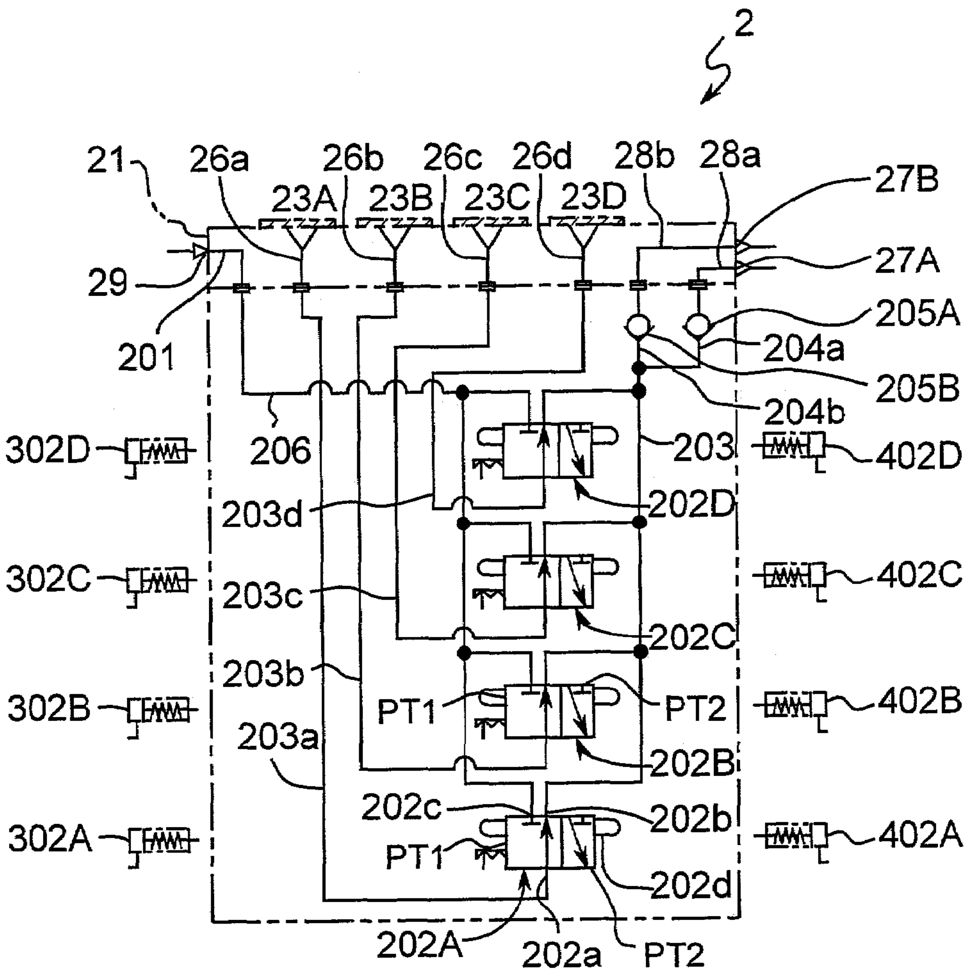
FIG. 3 is a schematic diagram illustrating air passages of the pallet.
Figure 28A:
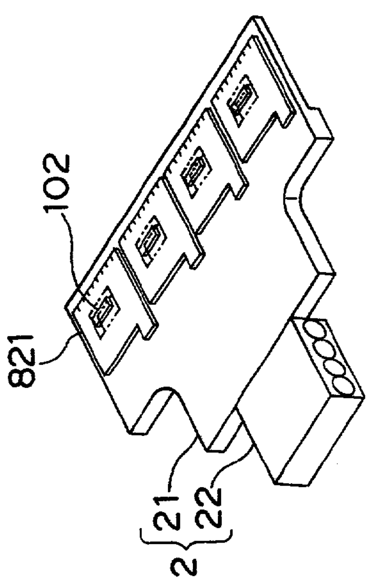
FIGS. 28A to 28D are perspective views illustrating examples of an arrangement of boards on pallets, wherein the boards are FPC boards and components are IC chips.

The mechanical valves 202A to 202D are set at first positions PT1 by pushing left ends of plungers 202*d* in FIG. 2, and set at second positions PT2 by pushing right ends of the plungers 202*d*. At the first position PT1, the first port 202*a* is connected to the second port 202*b*, whereas the third port 202*c* is closed (all the mechanical valves 202A to 202D are set at the first positions PT1 in FIG. 3). In other words, when any of the mechanical valves 202A to 202D is set at the first position PT1, the suction holes 24 of a corresponding one of the sucking sections 23A to 23D are connected to the first and second suction ports 27A and 27B, resulting in that LCD board 101 is sucked and held by the pallet body 21. On the other hand, at the second position PT2, the first port 202*a* is connected to the third port 202*c*, whereas the second port 202*b* is closed. In other words, when any of the mechanical valves 202A to 202D is set at the second position PT2, the suction holes 24 of a corresponding one of the sucking sections 23A to 23D are communicated with air through the exhaust port 29, resulting in that the sucking and holding of the LCD board 101 is released. Accordingly, each of the four sucking sections 23A to 23D can independently hold an LCD board 101, therefore a maximum of four LCD boards 101 can be sucked and held by the pallet body 21 as shown in FIG. 28A. As will be described later, the plungers 202*d* of respective mechanical valves 202A to 202D are switched by air cylinders 302A to 302D of the loading section 3 and air cylinders 402A to 402D of the unloading section 4.

Next, the loading section 3 will be described with reference to FIG. 1 and FIGS. 4A to 4C.

The loading section 3 comprises a loading stage 31 on which pallet 2 is placed, and a board carry-in mechanism 32 for carrying an LCD board 101 into the apparatus from outside thereof.

The loading stage 31 comprises a base portion 33 extending upwardly from a base frame 11, a first setting portion 34 mounted on the base portion 33 so as to be movable up and down along a Z-axial direction, a connecting portion 36 horizontally extending (in a Y-axial direction) and connected at its proximal end to an upper side of the first setting portion 34, and a second setting portion 37 provided at a distal end portion of the connecting portion 36. The first setting portion 34 and the second setting portion 37 are opposed to each other in the Y-axial direction in the drawings. Thus, between these setting portions, a space 35 for permitting the first carrying mechanism 96A to be received therein is formed.

Provided on an upper end of the first setting portion 34 are suction pads 38A, 38B. Similarly, suction pads 38C, 38D are provided on an upper end of the second setting portion 37. These suction pads 38A to 38D are disposed on the same level plane, and connected to a vacuum suction pump P1 via a passage 39. Three suction pads 38A to 38C of the four suction pads 38A to 38D are used to suck and hold the pallet 2 onto the loading stage 31, and the remaining one suction pad 38D is used to suck and hold the LCD board 101 onto a surface of the pallet 2.

The loading stage 31 is provided with air cylinders 301A and 301B for moving the first setting portion 34 up and down relative to the base portion 33. As mentioned above, the second setting portion 37 is connected to the first setting portion 34 by the connecting portion 36, and therefore, the second setting portion 37 moves up and down, as the first setting portion 34 moves up and down. Therefore, the suction pads 38A to 38D are moved up and down by the air cylinders 301A and 301B with their upper faces kept disposed on the same level plane.

Further, four air cylinders 302A, 302B, 302C and 302D (a first switching mechanism) respectively corresponding to the plungers 202*d* of the four mechanical valves 202A to 202D of the pallet 2 are arranged on a side of the distal end of the second setting portion 37 in a horizontal direction (the Y-axial direction in the drawings). When one of these air cylinders 302A to 302D is set at a projecting position, the left end of the plunger 202*d* of a corresponding one of the mechanical valves 202A to 202D is pressed. As a result, the corresponding one of the mechanical valves 202A to 202D is set at the first position PT1.

Figure 4A:
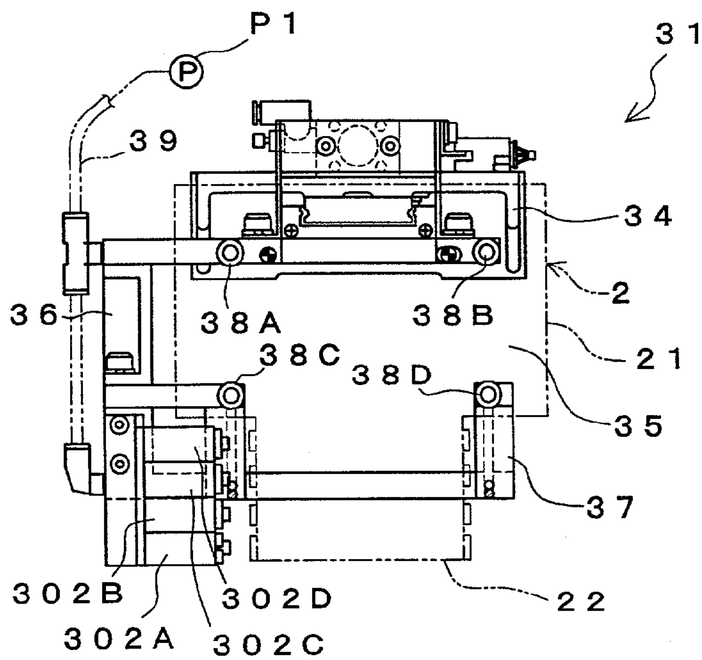
FIG. 4A is a plan view of a loading stage.
Figure 4B:
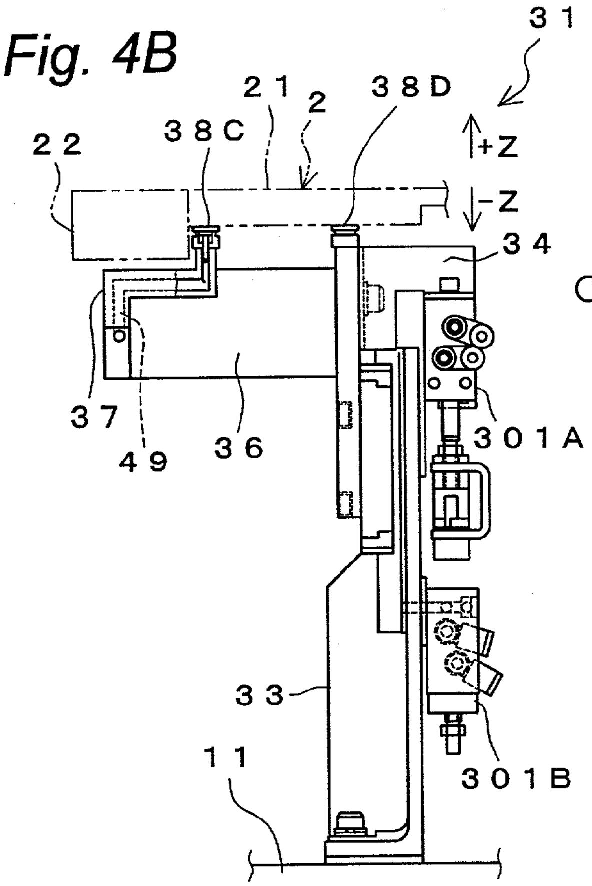
FIG. 4B is a right side view of the loading stage.
Figure 4C:
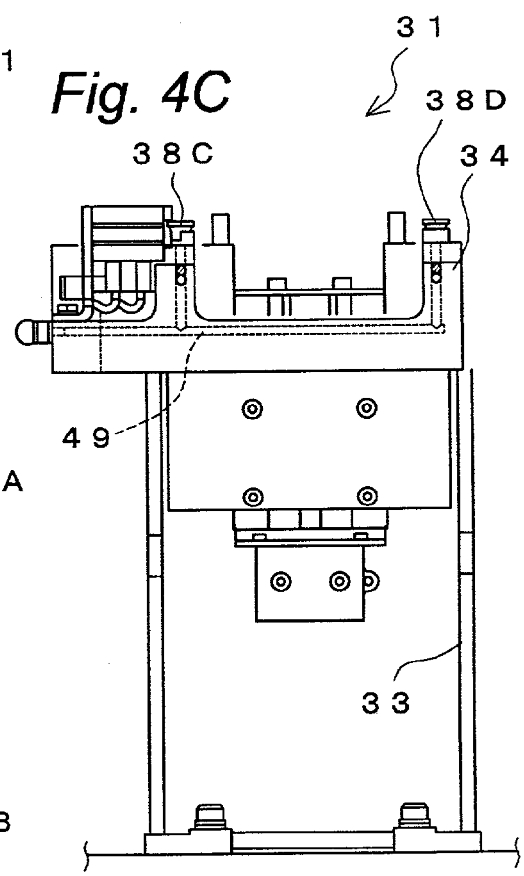
FIG. 4C is a front view of the loading stage.

As shown in FIGS. 4A and 4B, the underside 21*b* of the pallet body 21 is supported by the suction pads 38A to 38D so that the pallet 2 is placed on the loading stage 31. As described above, a sucking force of the vacuum suction pump P1 acts on the pallet 2 through the suction pads 38A to 38C to suck and hold the pallet 2 onto the loading stage 31. On the other hand, the suction pad 38D is aligned with the first suction port 27A formed in the underside 21*b* of the pallet body 21 (see FIG. 2). Accordingly, a sucking force of the vacuum suction pump P1 acts on the LCD board 101 from the suction pad 38D via the first suction port 27A, the passage 28*a*, the passage 204*a* including the check valve 205A, one of the mechanical valves 202A to 202D set at the first position PT1, the passages 203*a* to 203*d*, the passages 26*a* to 26*d*, and the suction holes 24 of the sucking sections 23A to 23D. Thus, the LCD board 101 is sucked and held onto the pallet body 21 by this sucking force of the vacuum suction pump P1.

As shown in FIG. 1, the board carry-in mechanism 32 comprises a carry-in slider 304 for carrying the LCD board 101 into the apparatus from outside thereof, and a loader 306 for transferring the LCD board 101 from the carry-in slider 304 onto the pallet 2 placed on the loading stage 31.

The carry-in slider 304 is reciprocated in the X-axial direction in drawings by rodless cylinder 307. The LCD board 101 placed on a top face of the carry-in slider 304 is sucked and held by the sucking force of vacuum suction pump P2 through a suction hole (not shown).

The loader 306 comprises an XY stage 308 driven by motors M1 and M2, and a loader arm 309 fixed at its proximal end to the XY stage 308. A loading head 311 and a recognition camera 312 are fixed on a distal end of the loader arm 309. The loading head 311 is rotated about its vertical axis by motor M3. The loading head 311 is caused to suck and hold the LCD board 101 at its underside by a sucking force of a vacuum suction pump P3.

Next, the ACF applying section 5, the pre-press bonding section 6 and the final press bonding section 7 are described with reference to FIG. 1.

First, the ACF applying section 5 applies an anisotropic conductive tape (ACF tape) 51 onto the LCD board 101 held by the pallet 2. The ACF applying section 5 comprises a feeding source 52 of the ACF tape 51, a heating-pressing tool 53 for pressing the ACF tape 51 onto the LCD board 101 and heating the same (for example, at 80° C.), and a backup tool 54 (see FIG. 13) for holding the LCD board 101 and the ACF tape 51 between itself and the heating-pressing tool 53. The ACF applying section 5 further comprises a cutter (not shown) for cutting the ACF tape 51 after the ACF tape 51 has been heated and pressed by the heating-pressing tool 53.

The pre-press bonding section 6 comprises a component pickup mechanism 61 for picking up an IC chip 102 from the IC chip feeding section 8, a component positioning mechanism 63 provided with a pre-press bonding head 62, and a backup tool 64 (see FIG. 13) for holding the IC chip 102 and the LCD board 101 between itself and the pre-press bonding head 62.

Figure 14:
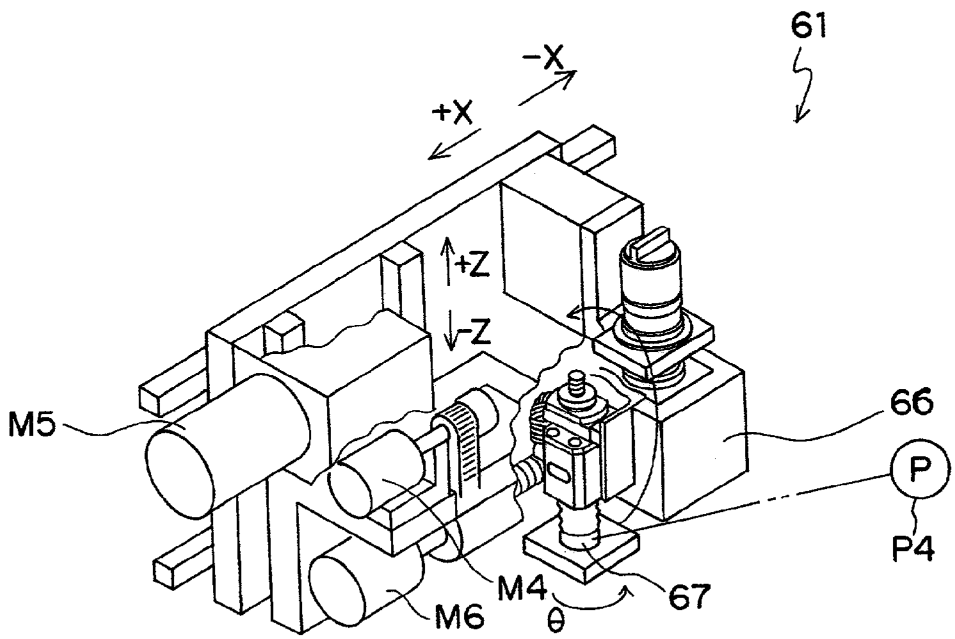
FIG. 14 is a perspective view of a component-pickup head of a pre-press bonding section.

As shown in FIG. 14, the component pickup mechanism 61 comprises a pickup head 67 integrated with a recognition camera 66. The pickup head 67 is caused to suck and hold the IC chip 102 by a sucking force of vacuum suction pump P4. The pickup head 67 is inversely driven in the vertical direction by the motor M4 and is driven to move up and down (in the Z-axial direction) by motor M5. A distal end of the pickup head 67 is rotated in direction θ by motor M6.

As shown in FIG. 1, the component positioning mechanism 63 comprises an XY table 68 for moving the pre-press bonding head 62 on a level plane using motors M7 and M8, a motor M9 for moving the pre-press bonding head 62 in the vertical direction (the Z-axial direction in the drawings), and a motor M10 for rotating the pre-press bonding head 62 about its vertical axis. The pre-press bonding head 62 is caused to suck and hold the IC chip 102 at its lower end by a sucking force of vacuum suction pump P7. The component positioning mechanism 63 also comprises a recognition camera 69 for recognizing the IC chip 102 sucked and held by the pre-press bonding head 62.

The final press bonding section 7 comprises an air cylinder S1 arranged in the vertical direction, a heating-pressing tool 71 mounted on a distal end of the air cylinder S1, a protective tape feeding mechanism 72, and a backup tool 74 (see FIG. 13) similar to those provided in the ACF applying section 5 and the pre-press bonding section 6. The protective tape feeding mechanism 72 is to feed a protective tape 73 between the heating-pressing tool 71 and the IC chip 102. The protective tape 73 is used to prevent the IC chip 102 from being sucked by the heating-pressing tool 71. The IC chip 102 is pressed and heated through the protective tape 73 between the heating-pressing tool 71 and the backup tool 74.

Next, the unloading section 4 is described with reference to FIG. 1 and FIGS. 5A to 5C.

The unloading section 4 is provided with an unloading stage 41 on which the pallet 2 is placed, and a board carry-out mechanism 42 for carrying out the LCD board 101 with the IC chip 102 mounted thereon from the apparatus to outside thereof.

The unloading stage 41 comprises a base portion 43 extending upwardly from the base frame 11, a first setting portion 44 mounted on the base portion 43 so as to be movable up and down (in the Z-axial direction in the drawings), a connecting portion 46 connected at its proximal end to an upper side of the first setting portion 44 and extending in the horizontal direction (the Y-axial direction in the drawings), and a second setting portion 47 arranged on a distal end portion of the connecting portion 46. The first setting portion 44 and the second setting portion 47 are opposed to each other in the Y-axial direction, and there is formed a space 45 therebetween to allow a latter described third carrying mechanism 96C to enter thereinto.

Provided on an upper end of the first setting portion 44 are suction pads 48A, 48B. Similarly, suction pads 48C, 48D are provided on an upper end of the second setting portion 47. These suction pads 48A to 48D are disposed on the same level plane, and connected to a vacuum suction pump P8 via a passage 49. Three suction pads 48A to 48C of the four suction pads 48A to 48D are used to suck and hold the pallet 2 onto the unloading stage 41, and the one remaining suction pad 48D is used to suck and hold the LCD board 101 onto the surface of the pallet 2.

The unloading stage 41 is provided with air cylinders 401A, 401B for moving the first setting portion 44 up and down relative to the base portion 43. As mentioned above, since the second setting portion 47 is connected to the first setting portion 44 by the connecting portion 46, the second setting portion 47 moves up and down, as the first setting portion 44 moves up and down. Therefore, the suction pads 48A to 48D are moved up and down by the air cylinders 401A, 401B with their upper faces kept disposed on the same level plane.

Further, four air cylinders 402A, 402B, 402C and 402D (a second switching mechanism), respectively corresponding to the plungers 202*d* of the four mechanical valves 202A to 202D of the pallet 2, are arranged on a side of a distal end portion of the second setting portion 47 in the horizontal direction (the Y-axial direction in the drawings). When one of these air cylinders 402A to 402D is set at a projecting position, the right end of the plunger 202*d* of a corresponding one of the mechanical valves 202A to 202D is pressed. As a result, the corresponding one of the mechanical valves 202A to 202D is set at the second position PT2.

Figure 5A:
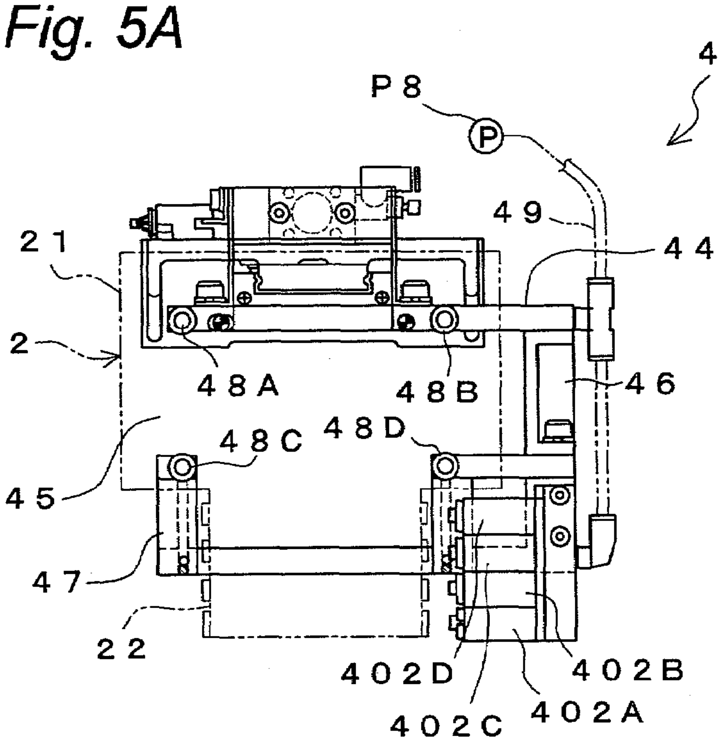
FIG. 5A is a plan view of an unloading stage.
Figure 5B:
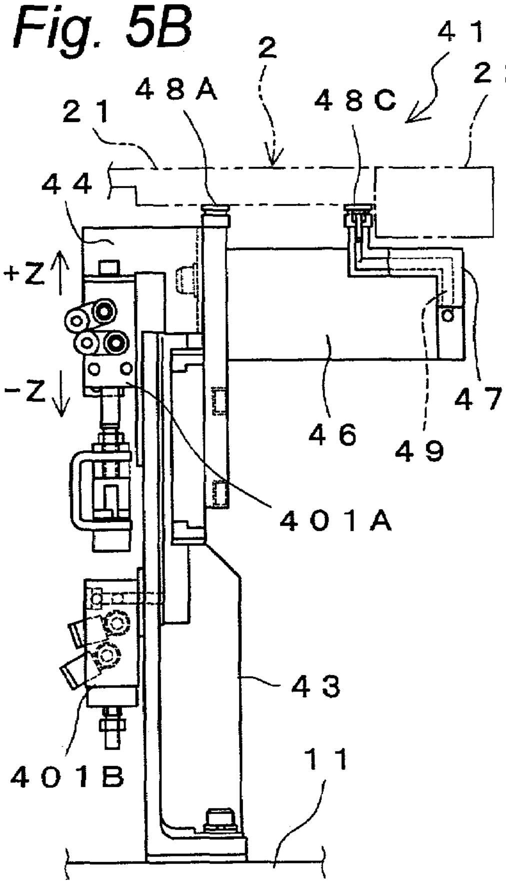
FIG. 5B is a left side view of the unloading stage.
Figure 5C:
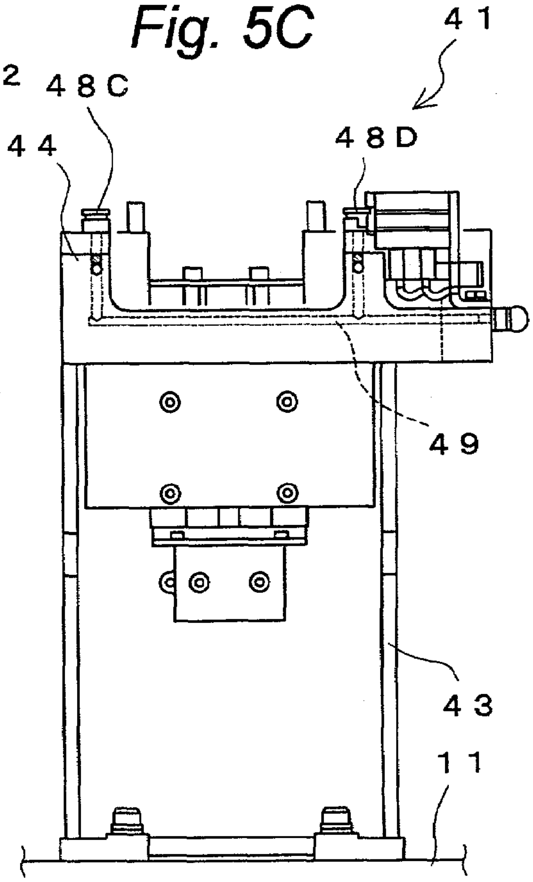
FIG. 5C is a front view of the unloading stage.
Figure 6:
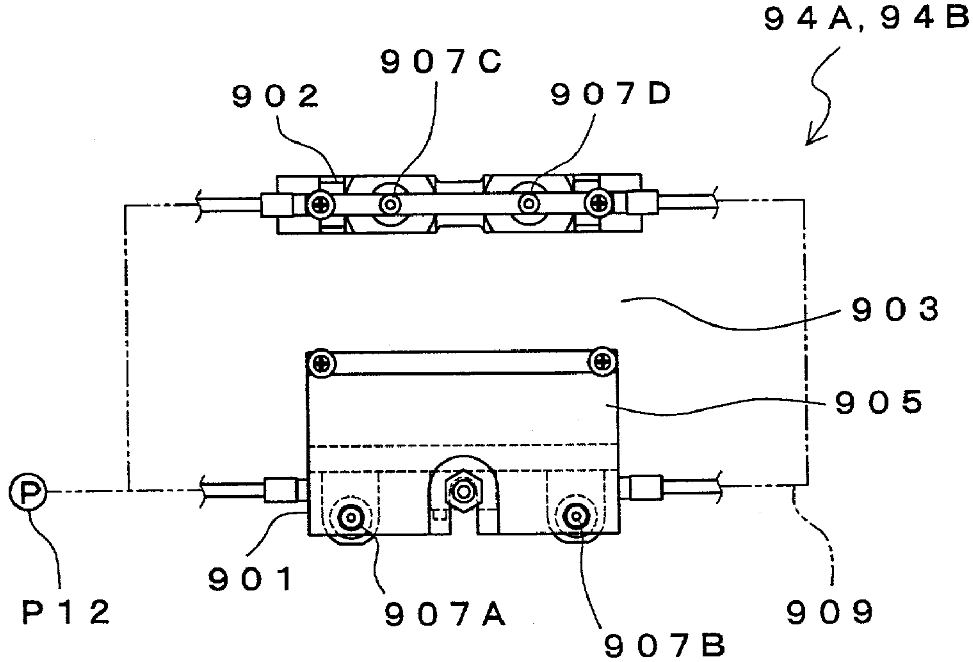
FIG. 6 is a plan view of first and second intermediate stages.
Figure 7:
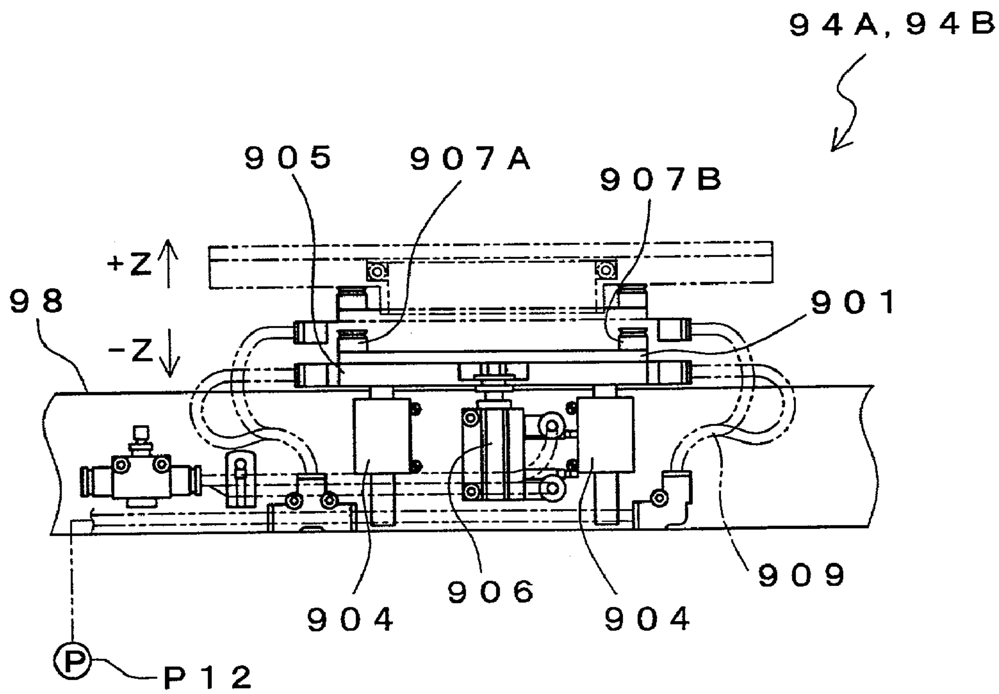
FIG. 7 is a front view of the first and second intermediate stages.
Figure 8:
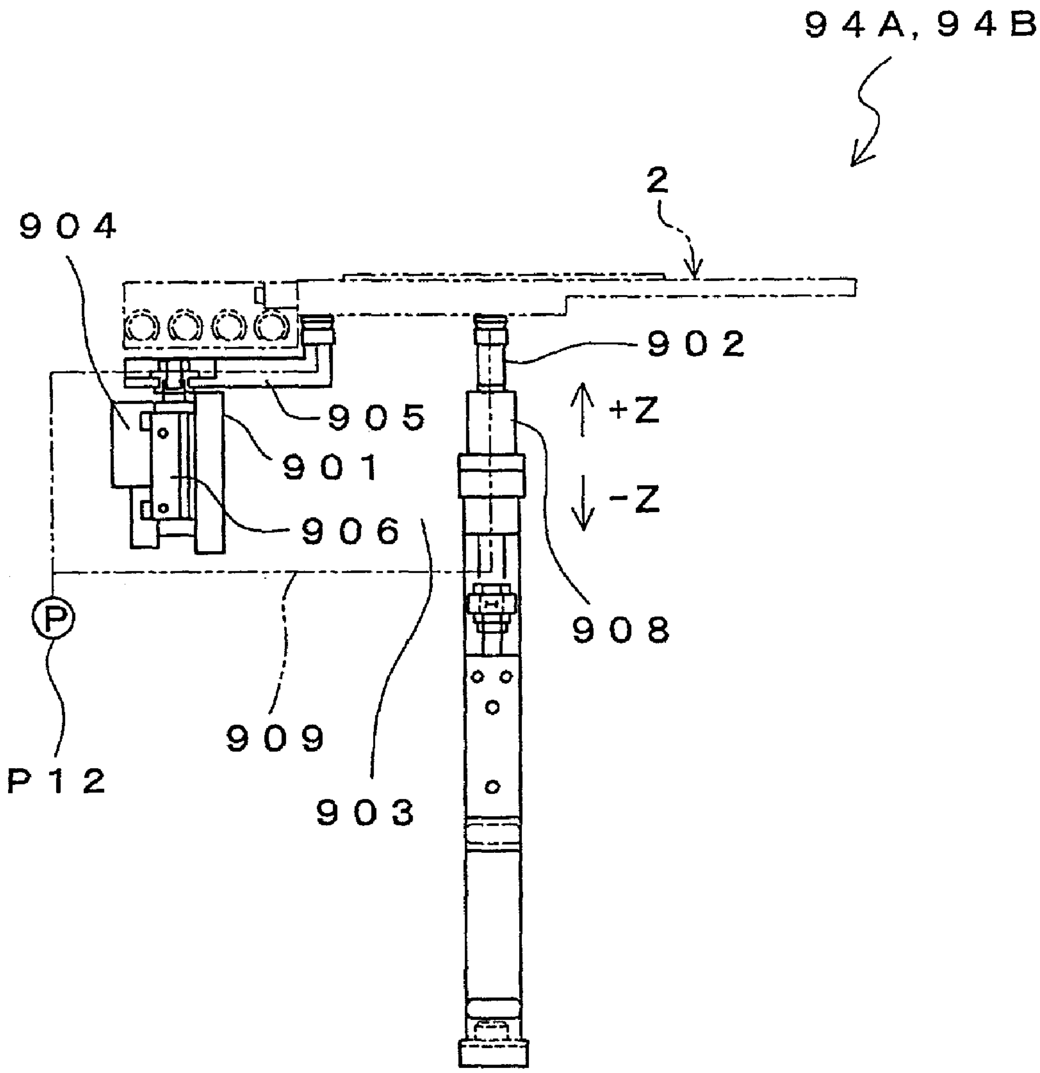
FIG. 8 is a right side view of the first and second intermediate stages.

As shown in FIGS. 5A and 5B, the underside 21*b* of the pallet body 21 is supported by the suction pads 48A to 48D so that the pallet 2 is placed on the unloading stage 41. As mentioned above, the sucking force of the vacuum suction pump P8 acts on the pallet body 21 through the suction pads 48A to 48C to suck and hold the pallet 2 onto the unloading stage 41. On the other hand, the suction pad 48D is aligned with the first suction port 27A formed in the underside 21*b* of the pallet body 21 (see FIG. 2), and thus, a sucking force of the vacuum suction pump P8 acts on the LCD board 101. As a result, the LCD board 101 is sucked and held onto the pallet body 21.

The board carry-out mechanism 42 comprises a carry-out slider 402 for carrying out the LCD board 101 from the apparatus, and an unloader 406 for transferring the LCD board 101 from the pallet 2 on the unloading stage 41 to the carry-out slider 402.

The carry-out slider 402 is reciprocated in the X-axial direction in drawings by rodless cylinder 407. The LCD board 101 placed on a top face of the carry-out slider 402 is sucked and held by a sucking force of a vacuum suction pump P9 through a suction hole (not shown).

The unloader 406 comprises an XY stage 408 driven by motors M12 and M13, and an unloader arm 409 fixed at its proximal end to the XY stage 408. Fixed on a distal end of the unloader arm 409 is an unloading head 411 that is rotated about its vertical axis by a motor M14. The unloading head 411 is caused to suck and hold the LCD board 101 at its underside by a sucking force of a vacuum suction pump P11.

Next, the pallet carrying section 9 is described with reference to FIG. 1 and FIGS. 6 to 12.

The pallet carrying section 9 comprises a forward carrying section 91 and a backward carrying section 92. The forward carrying section 91 carries the pallet 2 from the loading stage 31 of the loading section 3 to the unloading stage 41 of the unloading section 4 via the ACF applying section 5, the pre-press bonding section 6, and the final press bonding section 7. On the other hand, the backward carrying section 92 returns the pallet 2 from the unloading stage 41 of the unloading section 4 to the loading stage 31 of the loading section 3.

First, the forward carrying section 91 will be described.

The forward carrying section 91 comprises a first intermediate stage 94A arranged between the ACF applying section 5 and the pre-press bonding section 6, and a second intermediate stage 94B arranged between the pre-press bonding section 6 and the final press bonding section 7. As shown in FIG. 1, the loading stage 31 of the loading section 3, the ACF applying section 5, the first intermediate stage 94A, the pre-press bonding section 6, the second intermediate stage 94B, the final press bonding section 7, and the unloading stage 41 of the unloading section 4 are arranged on one straight line extending in the X-axial direction.

Figure 9:
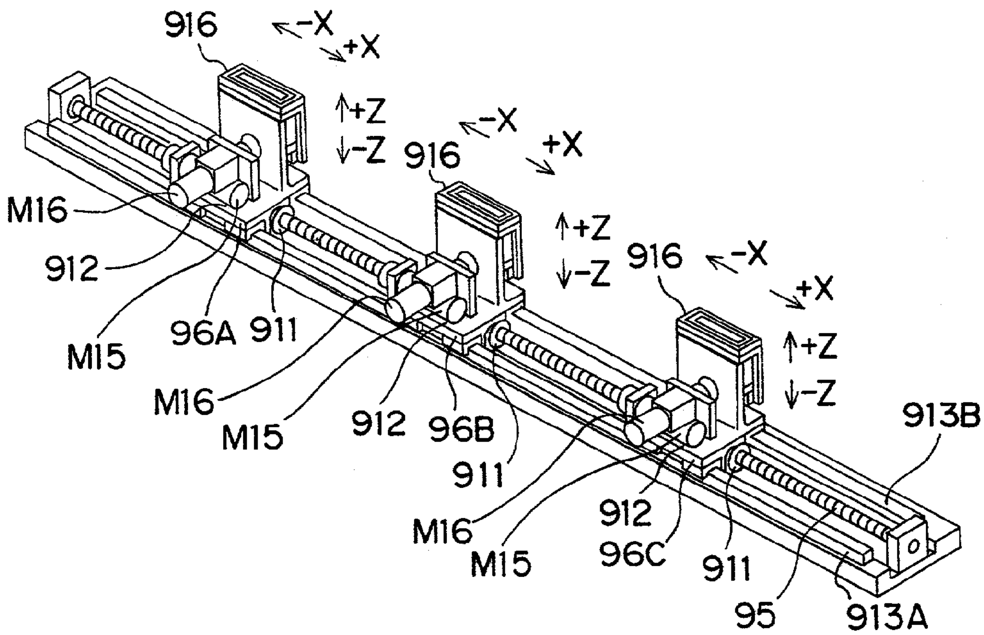
FIG. 9 is a perspective view of first to third carrying mechanisms of a forward carrying section.

As shown in FIGS. 1 and 9, the forward carrying section 91 includes a threaded shaft 95 which extends parallel to an arranging direction from the loading section 3 to the unloading section 4, that is, in the X-axial direction. The threaded shaft 95 is fixed on the base frame 11, and thus is not moved or rotated. Provided on the threaded shaft 95 are first to third carrying mechanisms 96A, 96B, 96C for carrying the pallet 2. Of these carrying mechanisms 96A to 96C, the first carrying mechanism 96A carries the pallet 2 from the loading stage 31 of the loading section 3 to the first intermediate stage 94A via the ACF applying section 5. The second carrying mechanism 96B carries the pallet 2 from the first intermediate stage 94A to the second intermediate stage 94B via the pre-press bonding section 6. The third carrying mechanism 96C carries the pallet 2 from the second intermediate stage 94B to the unloading stage 41 of the unloading section 4 via the final press bonding section 7.

Next, the first intermediate stage 94A will be described with reference to FIG. 1 and FIGS. 6 to 8.

The first intermediate stage 94A comprises a first setting portion 901 which is provided on a support plate 98 fixed on the base frame 11 by a pair of arms 97 and extends in the horizontal direction (the X-axial direction in the drawings), and a second setting portion 902 which is provided on the support plate 98, with the second setting portion 902 opposing the first setting portion 901 in the Y-axial direction. Between the first setting portion 901 and the second setting portion 902, there is formed a space 903 for allowing the first carrying mechanism 96A to enter thereinto.

The first setting portion 901 comprises a setting plate 905 supported on the support plate 98 by a guide 904 so as to move up and down (in the Z-axial direction in the drawings), and an air cylinder 906 for driving the setting plate 905 in the vertical direction. A pair of suction pads 907A and 907B are provided on an upper face of the setting plate 905. On the other hand, the second setting portion 902 is provided with an air cylinder 908 for moving an upper end portion of the second setting portion in the vertical direction (the Z-axial direction in the drawings). A pair of suction pads 907C and 907D are provided in the upper end portion of the second setting portion.

The suction pads 907A to 907D of the first and second setting portions 901 and 902 are disposed on the same level plane, and are connected to the vacuum suction pump P12 via a passage 909. The suction pads 907A, 907C, and 907D of the four suction pads 907A to 907D are used to suck and hold the pallet 2 itself onto the first intermediate stage 94A, and the remaining one suction pad 907B is used to suck and hold the LCD board 101 onto the pallet 2.

The air cylinder 906 for moving up and down the setting plate 905 of the first setting portion 901 is driven in synchronization with the air cylinder 908 for moving up and down the second setting portion 902. Accordingly, the four suction pads 907A to 907D are moved up and down while being held on the same level plane.

The second intermediate stage 94B has the same structure as the first intermediate stage 94A, except that the second intermediate stage 94B is arranged at a different position.

Next, the first carrying mechanism 96A will be described with reference to FIGS. 9 to 12.

The first carrying mechanism 96A comprises a base portion 912 provided with a cylindrical portion 911 at its underside into which the threaded shaft 95 is inserted. The cylindrical portion 911 includes a gear mechanism (not shown) engaged with the threaded shaft 95. When the gear mechanism is driven to rotate by a motor M15, the first carrying mechanism 96A in its entirety is moved on the threaded shaft 95 in accordance with a rotating direction of the gear mechanism. In addition, guide rails 913A, 913B extend at both sides of the threaded shaft 95 so as to support the first carrying mechanism 96A thereon. Further, an eccentric cam 915 driven by a motor M16 is provided on the base portion 912 of the first carrying mechanism 96A. A setting portion 916 separated from the base portion 912 is supported so as to be movable up and down on the base portion 912. The setting portion 916 is provided with a cam follower corresponding to the eccentric cam 915. Accordingly, when the motor M16 rotates, the setting portion 916 moves up and down in accordance with a rotating position of the eccentric cam 915.

Figure 10:
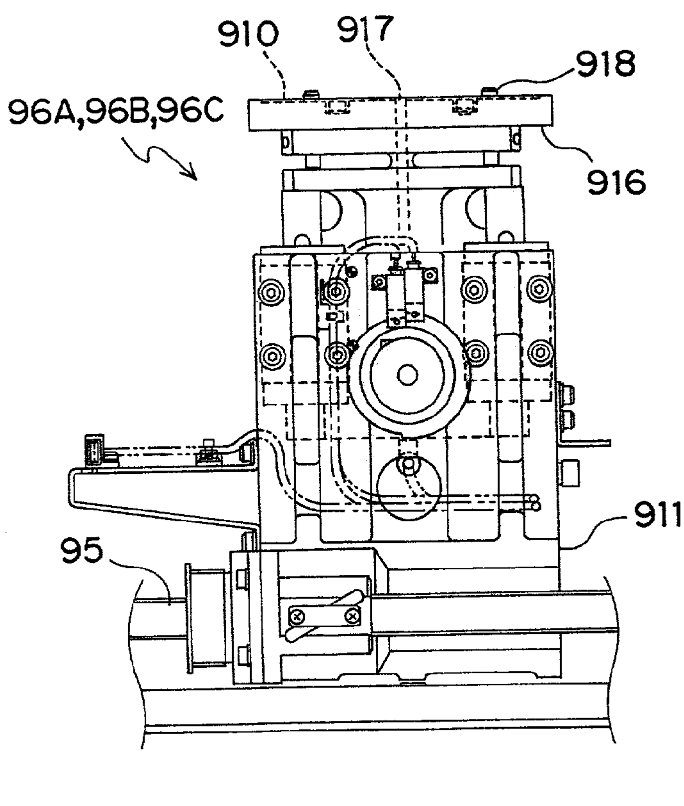
FIG. 10 is a front view of the first to third carrying mechanisms.
Figure 11:
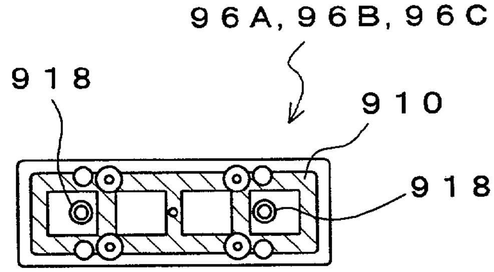
FIG. 11 is a plan view of the first to third carrying mechanisms.

As shown in FIGS. 10 and 11, formed in an upper end face of the setting portion 916 is a suction hole 917 used to suck and hold the pallet 2. The suction hole 917 is connected to a recessed portion 910 formed on an upper end face of the setting portion 916 (the hatched portion in FIG. 11). The recessed portion 910, when receiving the pallet 2, confronts the second suction port 27B, while the first suction port 27A has an area and a shape so designed as to come outside the recessed portion 910 (viewed from above). The suction hole 917 is also connected to a vacuum suction pump P16 via a passage 919. Further, a positioning pin 918 is provided on an upper end face of the setting portion 916. The positioning pin 918 is used to suck and hold the LCD board 101 onto the pallet 2, when the pallet 2 is placed on the upper end face of the setting portion 916.

Figure 12:
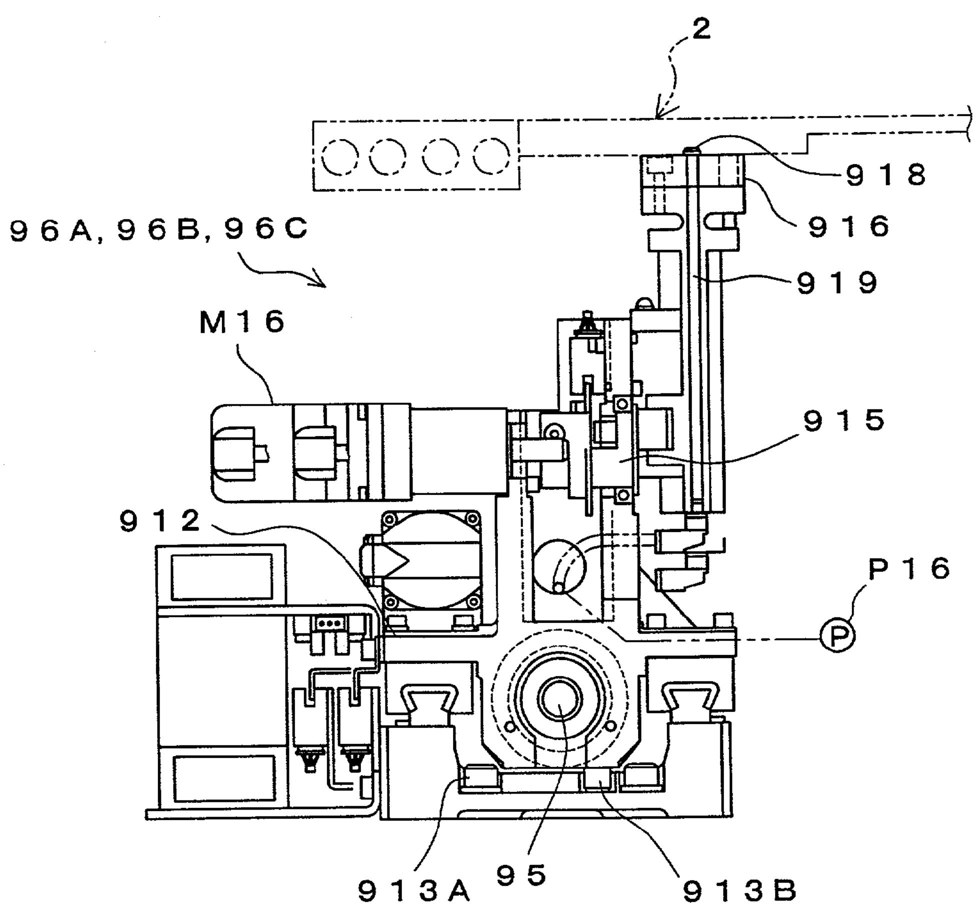
FIG. 12 is a right side view of the first to third carrying mechanisms.
Figure 13:
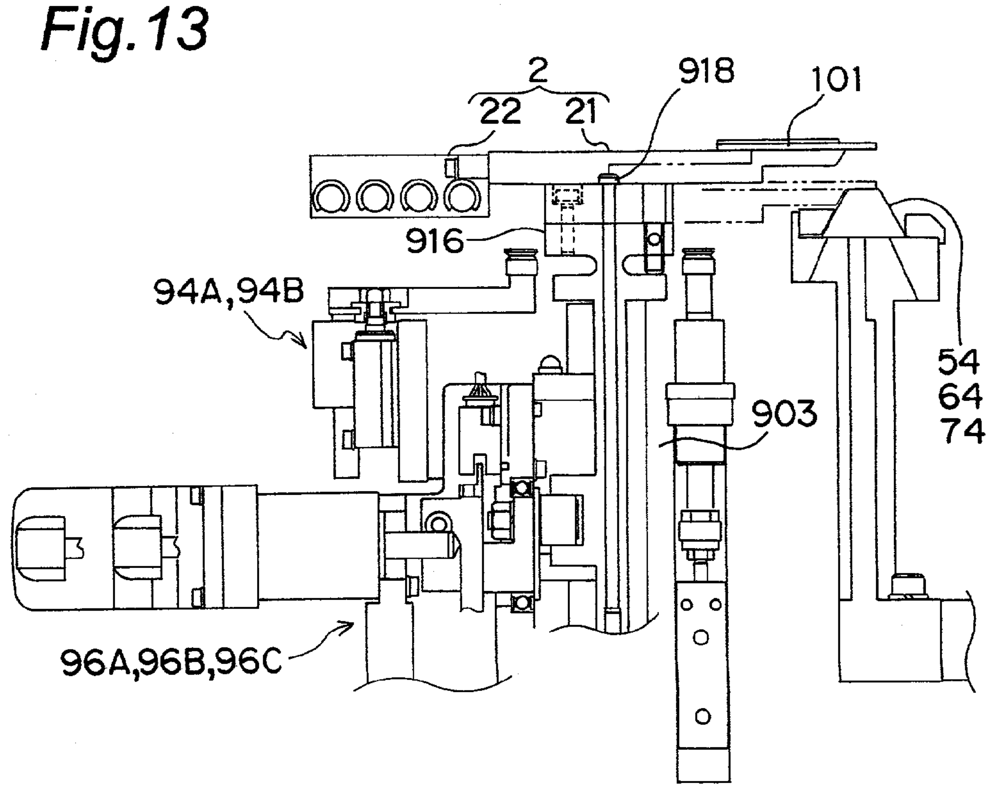
FIG. 13 is a partial side view showing a positional relationship between the first and second intermediate stages and the first to third carrying mechanisms.

As shown in FIGS. 12 and 13, the underside 21*b* of the pallet body 21 is supported by the setting portion 916 to thereby set the pallet 2 on the first carrying mechanism 96A.

The pallet 2 is sucked and held onto the first carrying mechanism 96A by a sucking force of the vacuum suction pump P16 which acts on the pallet 2 through the suction hole 917 and the recessed portion 910. A sucking force of the pump P16 also acts on the LCD board 101 from the recessed portion 910 connected to the suction hole 917 via the second suction port 27B, the passage 28*b*, the passage 204*b* including the check valve 205B, any of the mechanical valves 202A to 202D set at the first position PT1, passages 203*a* to 203*d*, the passages 26*a* to 26*d*, and the suction holes 24 of the sucking sections 23A to 23D. The LCD board 101 is sucked and held onto the pallet body 21 by this sucking force of the vacuum suction pump P116.

Structures of the second and third carrying mechanisms 96B and 96C are the same as that of the first carrying mechanism 96A, except for their positions on the threaded shaft 95.

As shown in FIG. 13, the first to third carrying mechanisms 96A to 96C through the space 903 can pass spaces 903 between the first setting portion 901 and the second setting portion 902 of each of the first intermediate stage 94A and the second intermediate stage 94B. The first to third carrying mechanisms 96A to 96C set distal end portions of LCD boards 101 on the ACF applying section 5, the pre-press bonding section 6, and the backup tool 74 of the final press bonding section 7, by up and down movement of the setting portion 916

Next, the backward carrying section 92 will be described with reference to FIG. 1.

The backward carrying section 92 comprises a threaded shaft 921 which extends in the arranging direction of the sections from the loading section 3 to the unloading section 4 and parallel to the threaded shaft 95. The threaded shaft 921 is driven to rotate by the motor M17 to thereby move the table 922 thereon. A slider 924 is provided on the table 922. The slider 924 is moved forward and backward in a direction orthogonal to the threaded shaft 921 (the Y-axial direction in the drawings) by cylinder 923. Suction holes are formed in an upper face of the slider 924, so that a sucking force of a vacuum suction pump P20 acts on the pallet 2 through the suction holes to thereby suck and hold the pallet 2 onto the slider 924.

Figure 15:
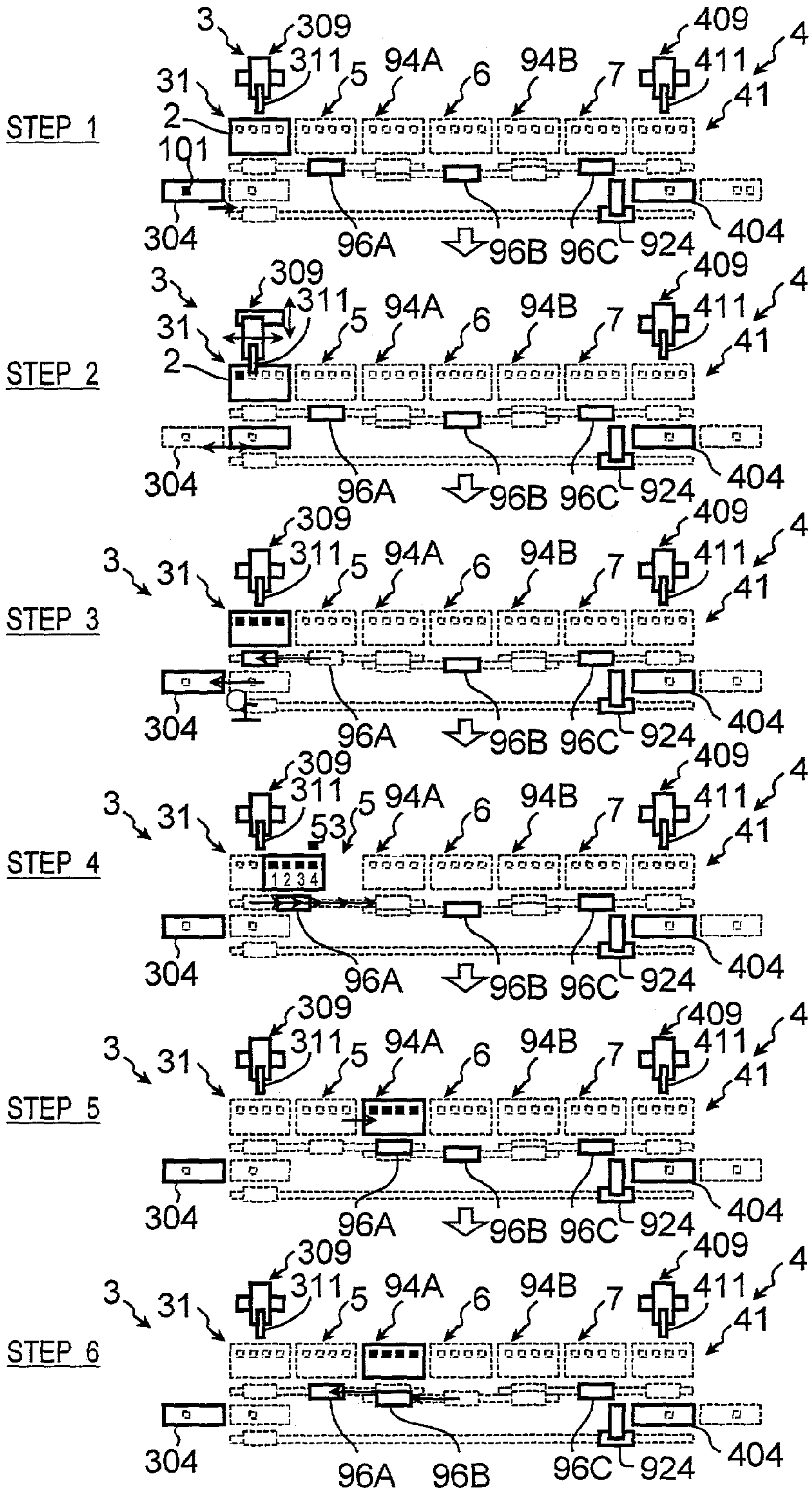
FIG. 15 shows schematic plan views illustrating operation of the component mounting apparatus from introduction of a board into the apparatus to displacement of the second carrying mechanism to the first intermediate stage.
Figure 16:
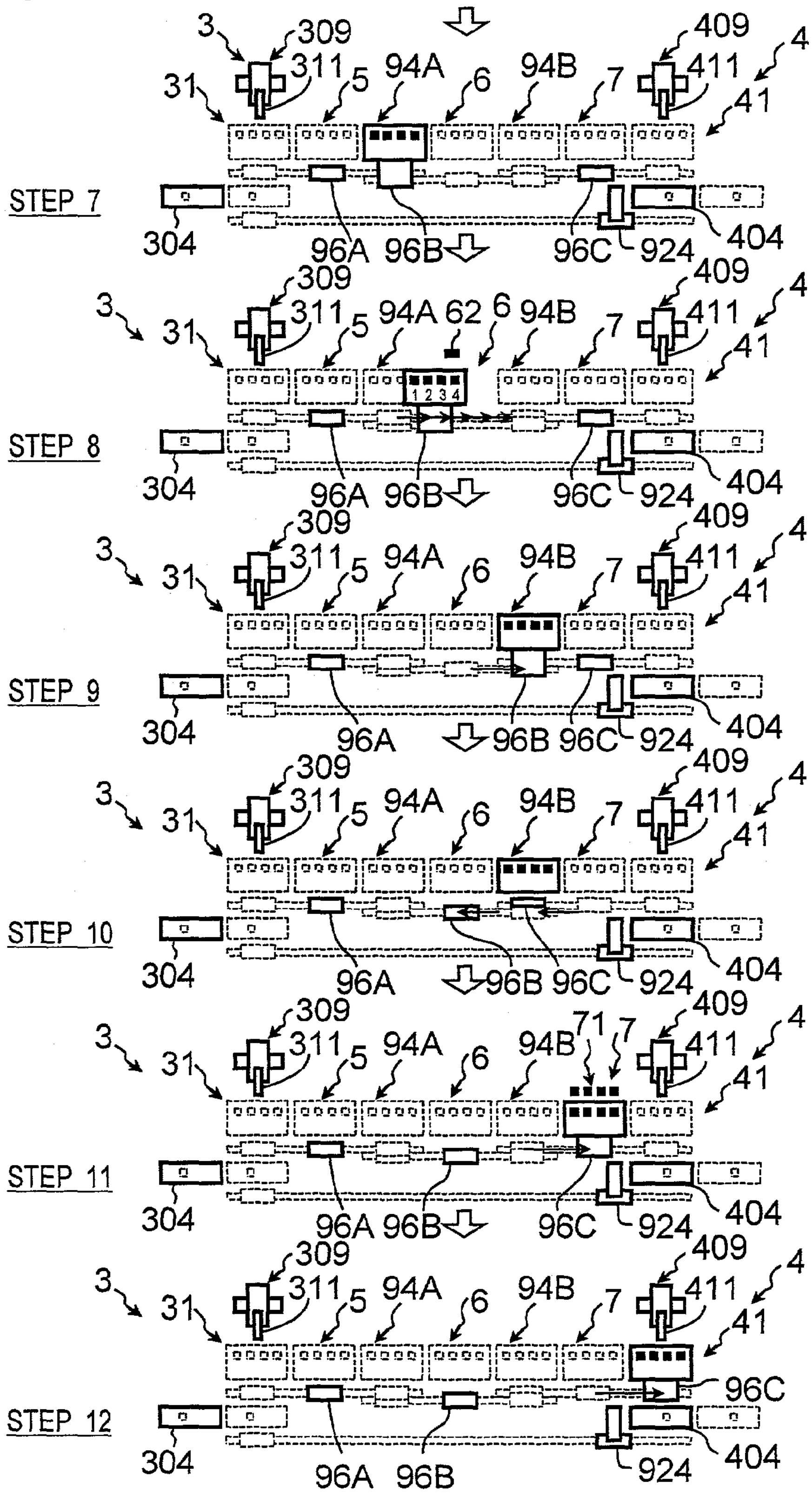
FIG. 16 shows schematic plan views illustrating operation of the component mounting apparatus for transferring the pallet from the first intermediate stage to the unloading stage.
Figure 17:
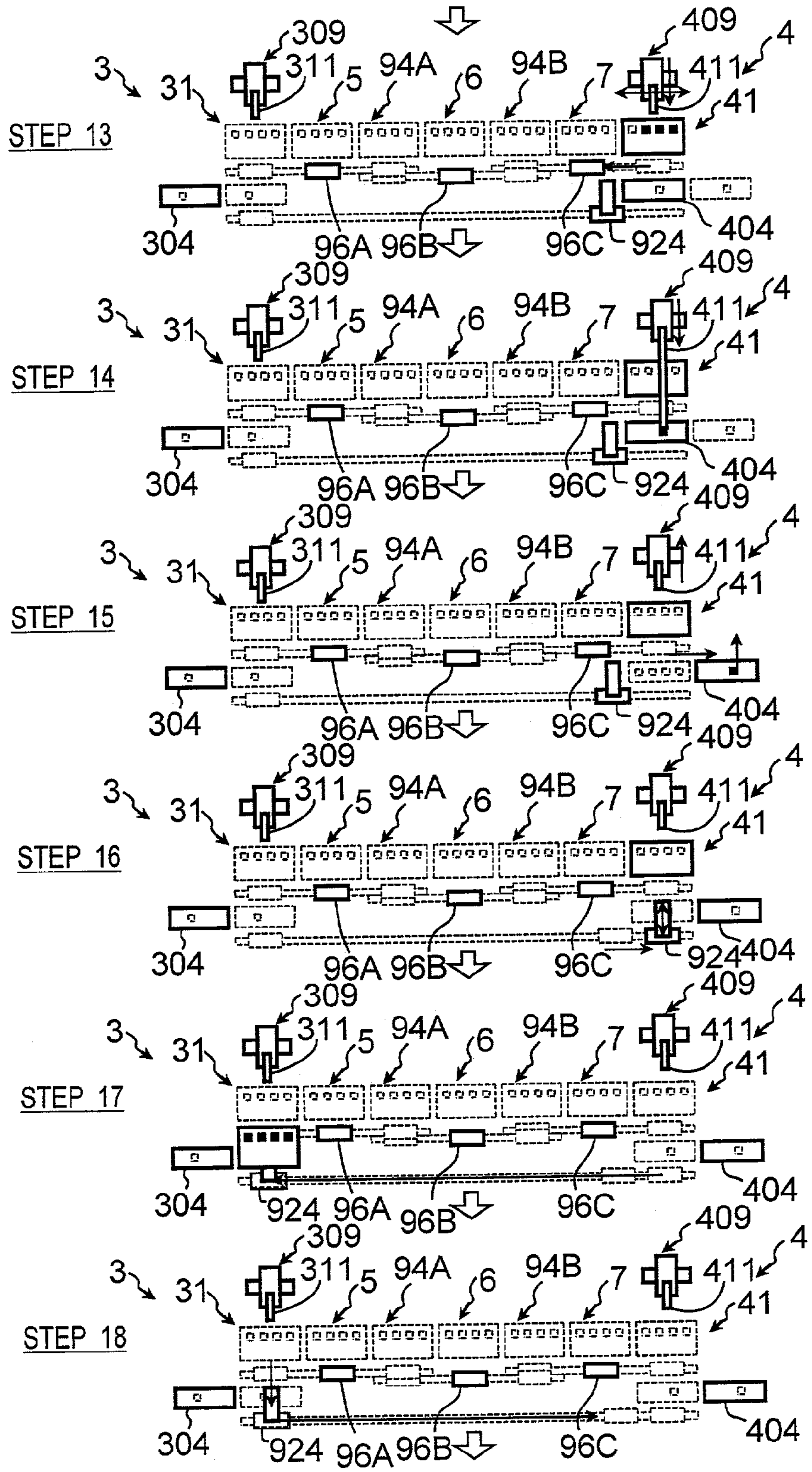
FIG. 17 shows schematic plan views illustrating operation of the component mounting apparatus from carrying-out of the board from the apparatus to returning of the pallet to the loading stage.

Next, operation of the component mounting apparatus 1 will be described with reference to FIGS. 15 to 17. FIGS. 15 to 17 show a course of travel of one pallet 2 from the loading stage 31 of the loading section 3 to the unloading stage 41 of the unloading section 4, and a course of travel of the one pallet 2 from the unloading stage 41 of the unloading section 4 to the loading stage 31 of the loading section 3.

Referring to FIG. 15, the carry-in slider 304, which has sucked and held a LCD board 101, is carried into the apparatus at Step 1. Feeding of the LCD board 101 to the carry-in slider 304 may be performed by a carry-in robot 111 which sucks and holds the LCD board 101 as schematically shown in FIG. 1, or may be manually performed.

At Step 2, the carry-in slider 304 is moved into the apparatus, and then, the loading head 311 of the loading section 3 transfers the LCD board 101 from the carry-in slider 304 to the pallet 2 held by the loading stage 31, while correcting a posture and position of the LCD board 101 based on recognition results from the recognition camera 312. The pallet 2 is sucked and held onto the suction pads 38A to 38C by a sucking force of the vacuum suction pump P1 (see FIG. 4). Which one of the sucking sections 23A to 23D of the pallet 2 is used to suck and hold the LCD board 101 is determined by selecting which one of the air cylinders 302A to 302D should be set at a projecting position. In other words, the sucking force acts on the LCD board 101 only through the suction holes 24 of any one of the sucking sections 23A to 23D whose corresponding mechanical valve, one of 202A to 202D, is set at the first position PT1. In this example, LCD boards 101 are sucked and held onto all the sucking sections 23A to 23D.

Figure 18A:
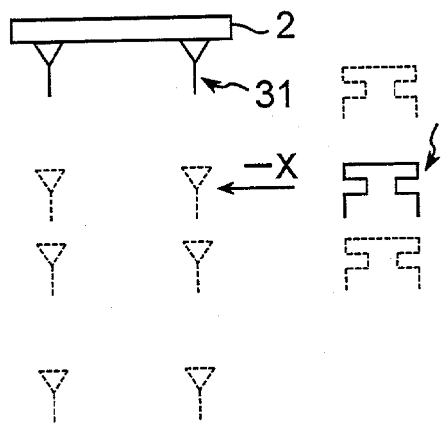
FIGS. 18A to 18F are schematic front views illustrating operation of transferring the pallet from the loading stage to the first carrying mechanism.
Figure 18B:
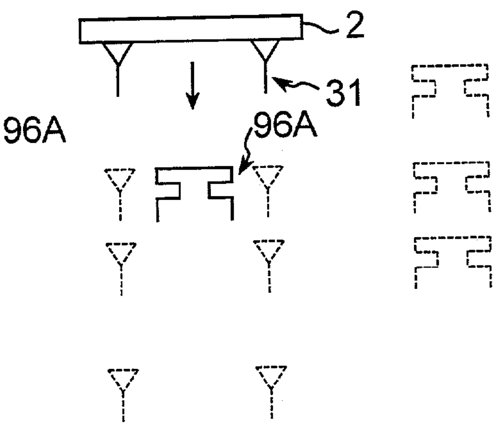
Figure 18C:
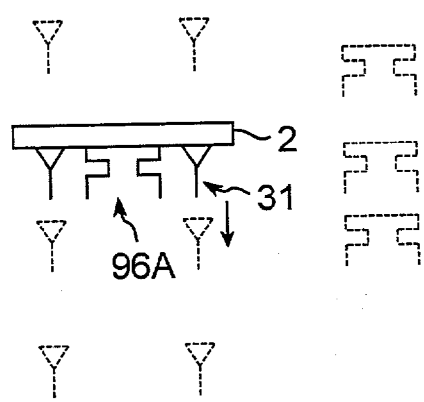

At Step 3, when the LCD boards 101 have been sucked and held onto all the sucking sections 23A to 23D, the pallet 2 is transferred from the loading stage 31 to the first carrying mechanism 96A. Transference of the pallet 2 is described with reference to FIGS. 18A to 18F. As shown in FIG. 18A, the loading stage 31 holding the pallet 2 is at an uppermost position, and a height position of the first carrying mechanism 96A is below the loading stage 31. Then, as shown in FIG. 18B, the first carrying mechanism 96A is moved on the threaded shaft 95 in a negative X-axial direction up to a position under the pallet 2. Then, as shown in FIG. 18C, the loading stage 31 is moved downward until the underside of the pallet 2 comes into contact with the first carrying mechanism 96A. Then, the vacuum suction pump P16 of the first carrying mechanism 96A starts sucking the pallet. As a result, the pallet 2 is sucked and held by the recessed portion 910 of the first carrying mechanism 96A. Further, a sucking force of the vacuum suction pump P16 acts on the LCD boards 101 on the pallet 2 to thereby suck and hold the LCD boards 101 onto the pallet 2. Then, the vacuum suction pump P16 stops sucking. As a result, the pallet 2 is left to be merely placed on the loading stage 31.

Figure 18D:
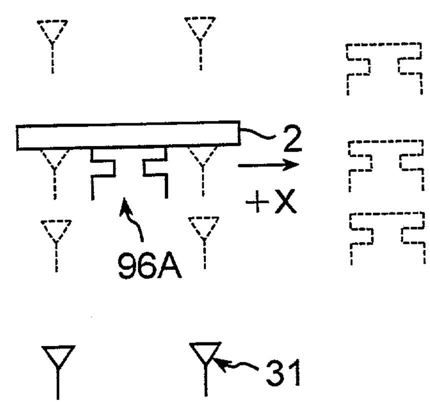

Then, as shown in FIG. 18D, the loading stage 31 is moved downward to leave the pallet 2. Since the check valve 205A is provided between the first port 27A and the sucking sections 23A to 23D of the pallet 2 as mentioned above, air leaking from the first port 27A is prevented, so that the LCD boards 101 can be continued to be sucked and held onto the pallet 2 by the sucking force of the vacuum suction pump P16 of the first carrying mechanism 96A, which acts on the LCD board 101 through the second port 27B.

Figure 18E:
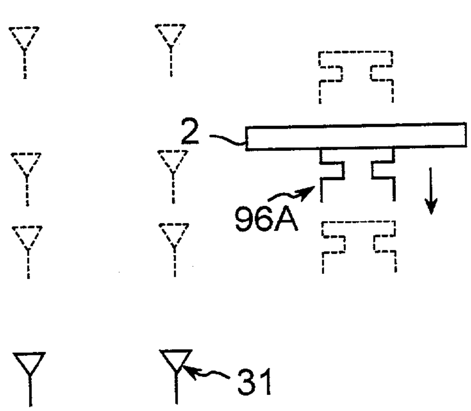

After completion of transference of the pallet 2, the first carrying mechanism 96A is moved in a positive X-axial direction as shown in FIGS. 18D and 18E, and the pallet 2 is carried from the loading stage 31 to the ACF applying section 5.

Figure 18F:
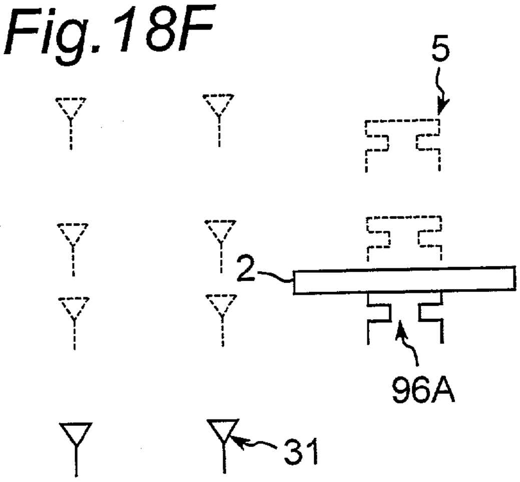

Then, referring to Step 4 of FIG. 15, in the ACF applying section 5, an ACF tape 51 is applied onto the LCD boards 101 sucked and held onto the sucking sections 23A to 23D of the pallet 2. During this step, the first carrying mechanism 96A has been moved downward up to a lowermost position as shown in FIG. 18F, and undersides of the LCD boards 101 come into contact with the backup tool 56 as indicated by the two-dot-chain line in FIG. 13. Referring to Step 4 of FIG. 15, while the first carrying mechanism 96A is being moved at regular pitches in the positive X-axial direction, the ACF tape 51 is applied onto each of the LCD boards 101 sucked and held onto the sucking sections 23A to 23D of the pallet 2.

Figure 19A:
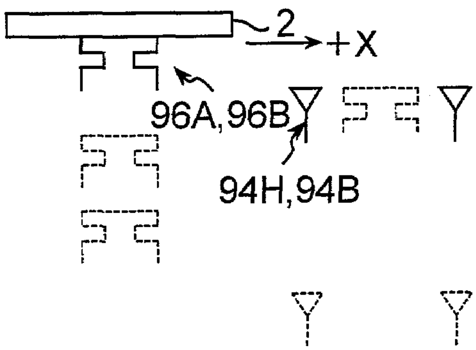
FIGS. 19A to 19E are schematic front views illustrating operation of transferring the pallet from the first carrying mechanism to the first intermediate stage.
Figure 19B:
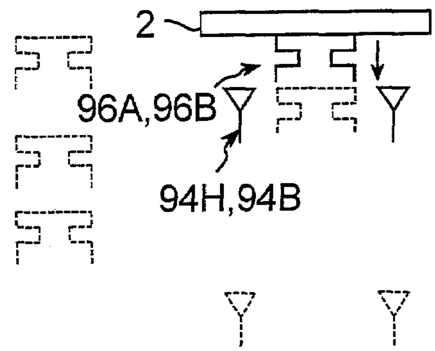
Figure 19C:
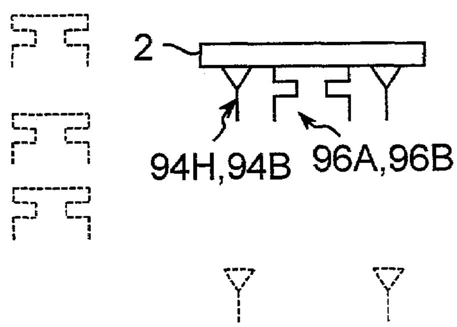

After completion of application of the ACF tape 51, the first carrying mechanism 96A is moved to the first intermediate stage 94A. After that, at Step 5 in FIG. 15, the pallet 2 is transferred from the first carrying mechanism 96A to the first intermediate stage 94A. This transference of the pallet 2 will be described with reference to FIGS. 19A to 19E. As shown in FIGS. 19A and 19B, the first carrying mechanism 96A holding the pallet 2 is first moved in the positive X-axial direction up to the first intermediate stage 94A. Then, the first carrying mechanism 96A is moved downward until the underside of the pallet 2 comes into contact with the first intermediate stage 94A as shown in FIG. 19C. At this point in time, the suction pad 907B of the first intermediate stage 94A is aligned with first port 27A of the pallet 2. Then, the vacuum suction pump P12 of the first intermediate stage 94A starts sucking. As a result, the pallet 2 is sucked and held onto the suction pads 907A, 907C, 907D of the first intermediate stage 94A, so that the pallet 2 and the LCD boards 101 on the pallet 2 are sucked and held by a sucking force of the vacuum suction pump P12. Then, the vacuum suction pump P16 of the first carrying mechanism 96A stops sucking. As a result, the pallet 2 is left to be merely placed on the first carrying mechanism 96A.

Figure 19D:
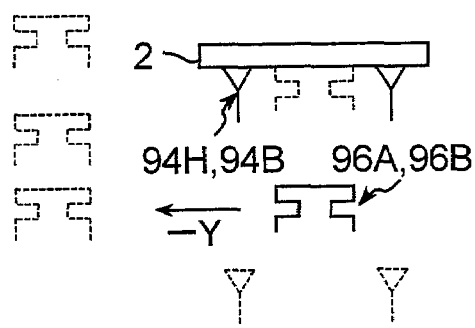

Then, with reference to FIG. 19D, the first carrying mechanism 96A is moved downward to leave the pallet 2. Since the check valve 205B is provided between the second port 27B and each of the sucking sections 23A to 23D of the pallet 2 as mentioned above, air leaking from the second port 27B is prevented, so that the LCD boards 101 can be continued to be sucked and held onto the pallet 2 by the sucking force of the vacuum suction pump P12 of the first intermediate stage 94A, which acts on the LCD boards through the first port 27A.

Figure 19E:
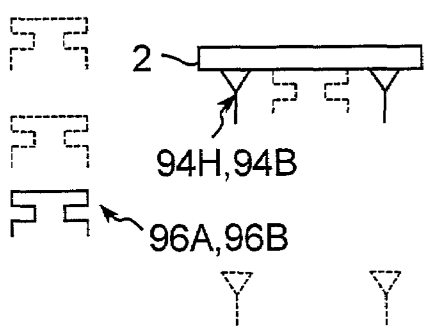

After completion of this transference of the pallet 2 from the first carrying mechanism 96A to the first intermediate stage 94A, the first carrying mechanism 96A is moved in the negative X-axial direction to leave the first intermediate stage 94A as shown in FIGS. 19D and 19E. At Step 6 in FIG. 15, the second carrying mechanism 96B is moved to the first intermediate stage 94A.

Figure 20A:
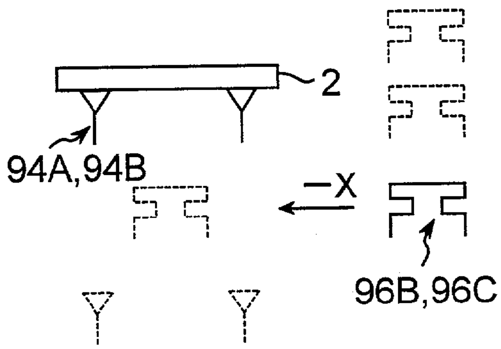
FIGS. 20A to 20F are schematic front views illustrating operation of transferring the pallet from the first intermediate stage to the second carrying mechanism.
Figure 20B:
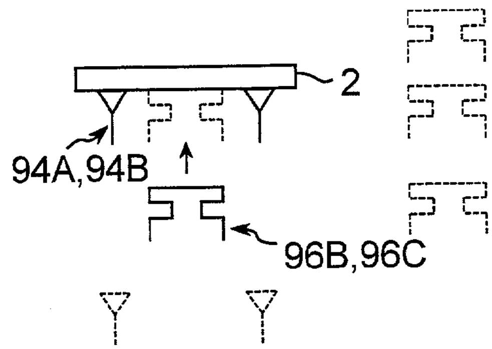
Figure 20C:
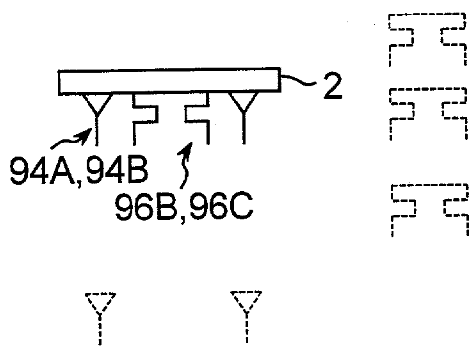
Figure 20D:
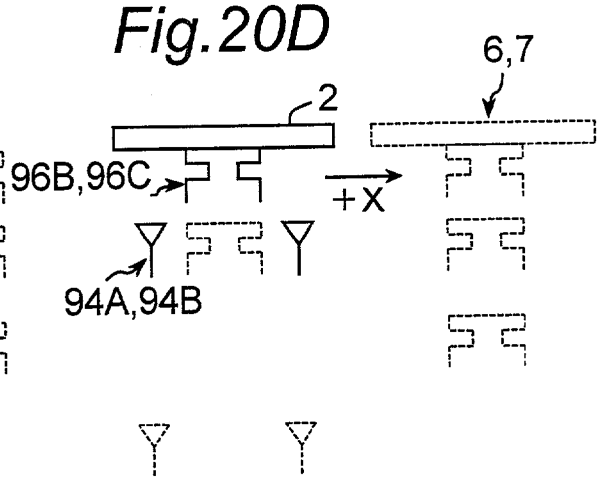
Figure 20E:
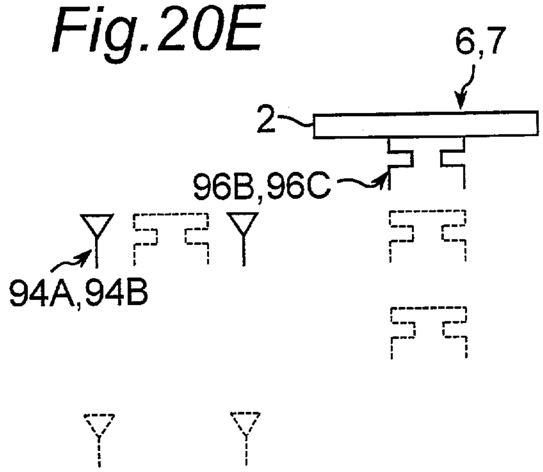

Then, referring to Step 7 of FIG. 16, the pallet 2 is transferred from the first intermediate stage 94A to the second carrying mechanism 96B. This transference of the pallet 2 will be described with reference to FIGS. 20A to 20F. First, as shown in FIG. 20A, the second carrying mechanism 96B is moved in the negative X-axial direction up to a position under the pallet 2 sucked and held onto the first intermediate stage 94A. Then, as shown in FIGS. 20B and 20C, the second carrying mechanism 96B is moved upward until it comes into contact with the underside of the pallet 2. Then, the vacuum pump P16 of the second carrying mechanism 96B starts sucking. As a result, the pallet 2 is sucked and held onto the suction hole 917 of the second carrying mechanism 96B, and the pallet 2 and the LCD boards 101 on the pallet 2 are sucked and held by a sucking force of the vacuum suction pump P16. Then, the vacuum suction pump P12 of the first intermediate stage 94A stops sucking. As a result, the pallet 2 is left to be merely placed on the first intermediate stage 94A. Then, as shown in FIG. 20C, the second carrying mechanism 96B is moved upward, so that the first intermediate stage 94A leaves the pallet 2. After this transference of the pallet 2, the second carrying mechanism 96B with the pallet 2 sucked and held thereonto is moved in the positive X-axial direction up to the pre-press bonding section 6 as shown in FIGS. 20D and 20E.

Figure 20F:
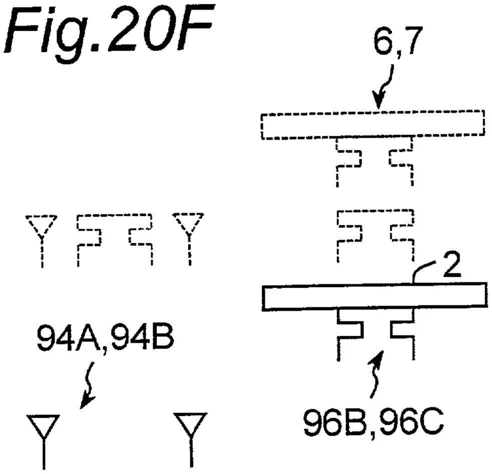

Then, referring to Step 8 of FIG. 16, in the pre-press bonding section 6, IC chips 102 are preliminarily bonded onto the LCD boards 101 sucked and held onto the sucking sections 23A to 23D of the pallet 2. During this step, the second carrying mechanism 96B has been moved downward up to a lowermost position as shown in FIG. 20F, and undersides of the LCD boards 101 come into contact with the backup tool 64 as indicated by the two-dot-chain line in FIG. 13. In the pre-press bonding section 6, the IC chips 102, having been fed from the IC chip feeding section 8 to the pre-press bonding head 62 by the pickup head 67, are positioned relative to mounting positions of the LCD boards 101 based on recognition results from the recognition camera 69, and then subjected to pre-press bonding. Further, in the pre-press bonding section 6, while the second carrying mechanism 96B is being moved at regular pitches in the positive X-axial direction, the IC chips 102 are preliminarily bonded on each of the LCD boards 101 sucked and held onto the sucking sections 23A to 23D of the pallet 2.

After completion of this pre-press bonding of the IC chips 102, the second carrying mechanism 96B is moved to the second intermediate stage 94B. After that, the pallet 2 is transferred from the second carrying mechanism 96B to the second intermediate stage 94B at Step 9 in FIG. 16. This transference of the pallet 2 is performed in the same manner as is the transference of the pallet 2 from the first carrying mechanism 96A to the first intermediate stage 94A described with reference to FIGS. 19A to 19E. The pallet 2 transferred to the second intermediate stage 94B is then transferred from the second intermediate stage 94B to the third carrying mechanism 96C at Step 10 in FIG. 16. This transference of the pallet 2 is performed in the same manner as is the transference of the pallet 2 from the first intermediate stage 94A to the second carrying mechanism 96B described above with reference to FIGS. 20A to 20F.

At Step 11 of FIG. 16, the third carrying mechanism 96C holding the pallet 2 is moved to the final press bonding section 7, and the IC chips 102 are bonded to the LCD boards 101 sucked and held onto the sucking sections 23A to 23D of the pallet 2. In this example, main bonding is performed for all the LCD boards 101 held onto the pallet 2 at once by the heating-pressing tool 71 of the final press bonding section 7.

After completion of this final press bonding, the third carrying mechanism 96C is moved to the unloading stage 41 of the unloading section 4.

Figure 21A:
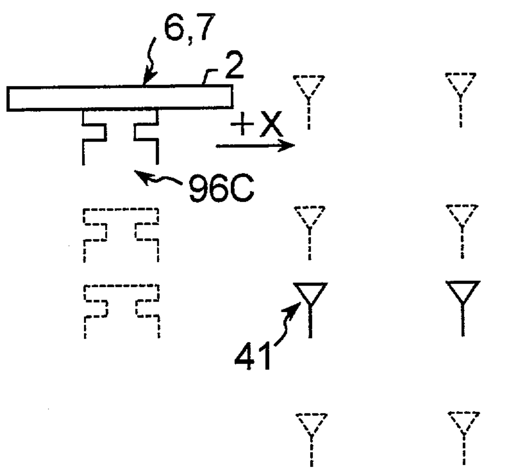
FIGS. 21A to 21E are schematic front views illustrating operation of transferring the pallet from the carrying mechanism to the unloading stage.
Figure 21B:
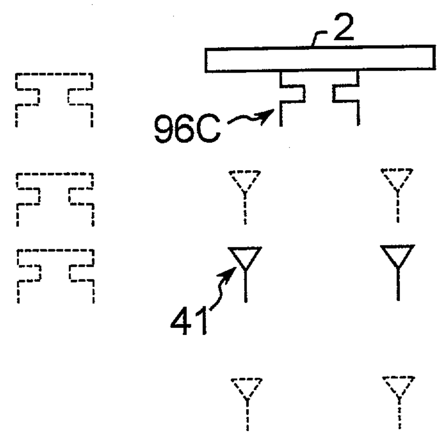
Figure 21C:
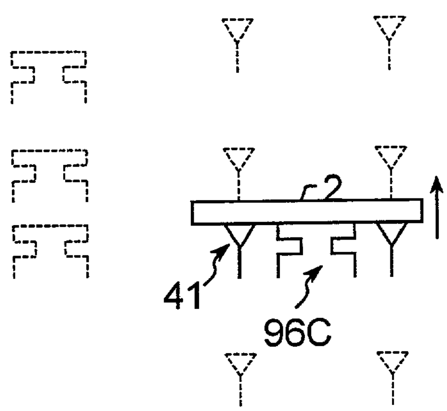

Then, at Step 12 in FIG. 16, the pallet 2 is transferred from the third carrying mechanism 96C to the unloading stage 41. This transference of the pallet 2 is described with reference to FIGS. 21A to 21F. As shown in FIGS. 21A and 21B, the third carrying mechanism 96C is first moved in the positive X-axial direction up to the unloading stage 41. Then, as shown in FIG. 21C, the third carrying mechanism 96C is moved downward until the underside of the pallet 2 comes into contact with the unloading stage 41. At this point in time, the suction pad 48D of the unloading stage 41 is aligned with the first port 27A of the pallet 2. Then, the vacuum suction pump P8 of the unloading stage 41 starts sucking. As a result, by a sucking force of the vacuum suction pump P8, the pallet 2 is sucked and held onto the suction pads 48A to 48C of the unloading stage 41, and the LCD boards 101 are sucked and held on the pallet 2. Then, the vacuum suction pump P16 of the third carrying mechanism 96C stops sucking. As a result, the pallet 2 is left to be merely placed on the third carrying mechanism 96C.

Figure 21D:
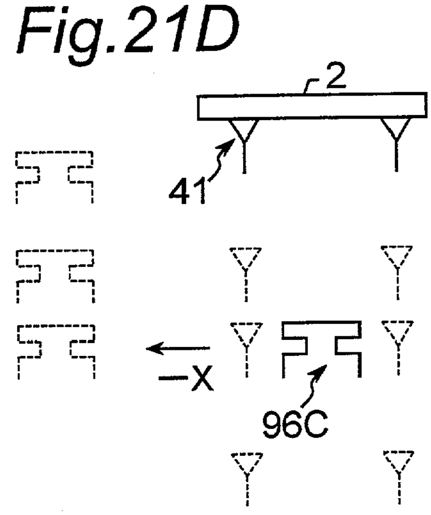
Figure 21E:
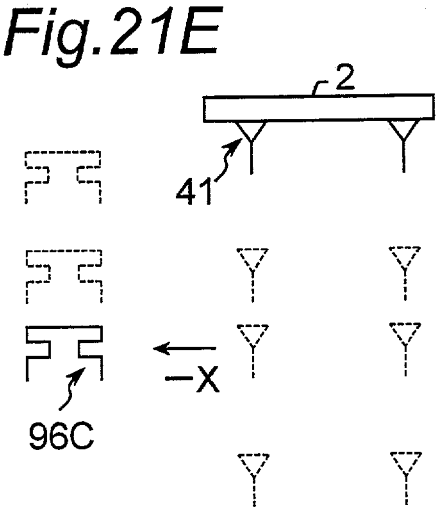

Then, as shown in FIG. 21D, the unloading stage 41 is moved upward so that the pallet 2 leaves the third carrying mechanism 96C. After that, as shown in FIG. 21E, the third carrying mechanism 96C is moved in the negative X-axial direction to leave the unloading stage 41.

Then, at Step 13 in FIG. 17, the carry-out slider 404 is moved into the apparatus. Further, at Step 14, the unloading head 411 of the unloading section 4 transfers the LCD boards 101 from the pallet 2 held onto the unloading stage 41 to the carry-out slider 404. At Step 15, after sucking and holding the LCD boards 101, the carry-out slider 404 is moved out from the apparatus, and the LCD boards 101 are carried out from the carry-out slider 404. This carry-out of the LCD boards 101 from the carry-out slider 404 may be performed by a carry-out robot 112 which sucks and holds the LCD boards 101 as schematically shown in FIG. 1, or may be manually performed. These operations of Steps 13 to 15 are repeated until all the LCD boards 101 on the pallet 2 have been carried out from the apparatus.

Which one of the LCD boards 101 on the sucking sections 23A to 23D of the pallet 2 is removed from the pallet 2 can be determined by selecting which one of the air cylinders 402A to 402D should be projected. That is, when one of the air cylinders 402A to 402D is set at the projecting position to switch a corresponding one of the mechanical valves 202A to 202D to the second position PT2, a corresponding one of the sucking sections 23A to 23D is opened to air through the exhaust port 29, the exhaust passage 201, and a corresponding one of the passages 26*a* to 26*d*. As a result, suction-holding of the LCD board 101 is released.

Figures 22A, 22B, 22C, 22D:
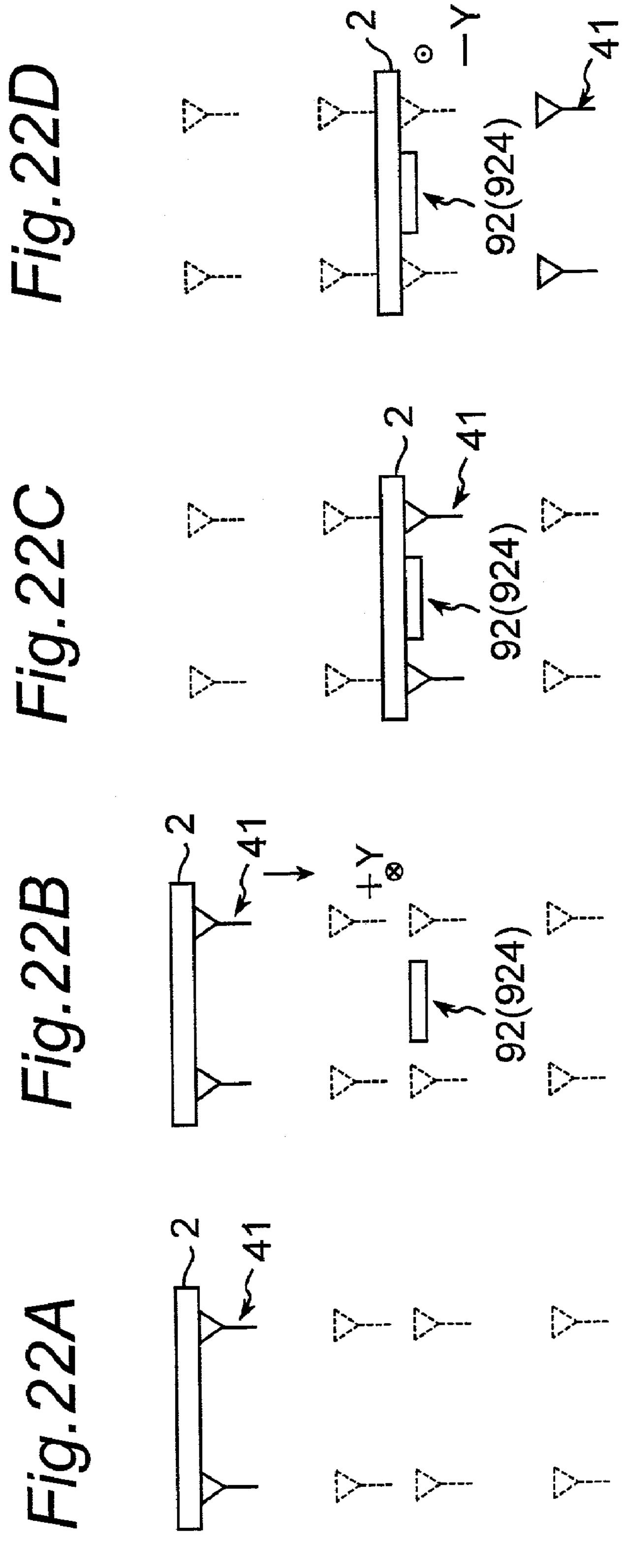
FIGS. 22A to 22D are schematic front views illustrating operation of transferring the pallet from the unloading stage to a backward carrying section.

Then, at Step 16, the LCD boards 101 are transferred from the unloading stage 41 to the slider 924 of the backward carrying section 92. This transference of the pallet 2 will be described with reference to FIGS. 22A to 22D. First, as shown in FIG. 22A, the unloading stage 41 holding the pallet 2 is located at an uppermost position. Then, as shown in FIG. 22B, the slider 924 is moved in a positive Y-axial direction in the drawings to reach a position under the LCD boards 101 held onto the unloading stage 41. After that, as shown in FIG. 22C, the unloading stage 41 is moved downward until the underside of the pallet 2 comes into contact with the slider 924. Then, the vacuum suction pump P20 of the backward carrying section 92 starts sucking. In the meantime, the vacuum suction pump P8 of the unloading stage 41 stops sucking. As shown in FIG. 22D, the unloading stage 41 is further moved downward to leave the underside of the pallet 2, and then, the slider 924 is moved backward in a negative Y-axial direction up to an initial position.

Figure 23A:
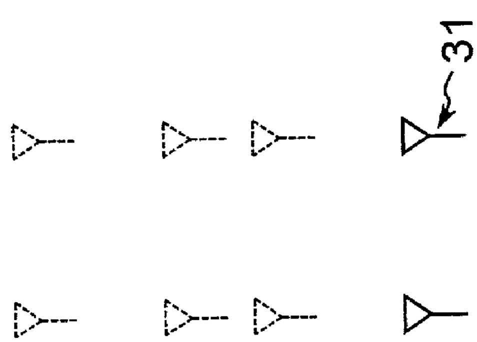
FIGS. 23A to 23D are schematic front views illustrating operation of transferring the pallet from the backward carrying section to the loading stage.
Figure 23B:
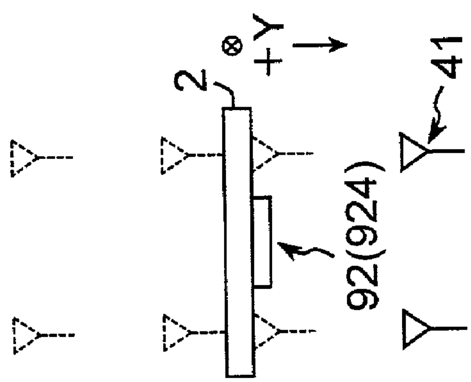
Figure 23C:
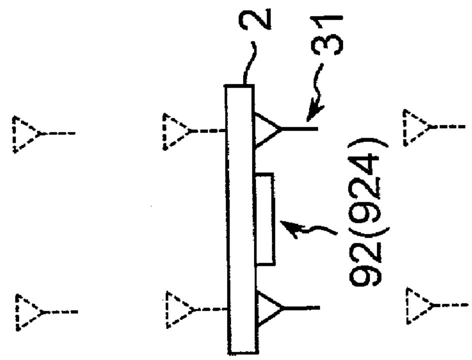
Figure 23D:
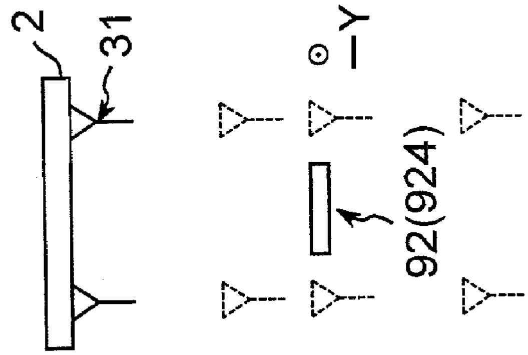

Then, at Step 17 in FIG. 17, the threaded shaft 921 is driven to be rotated by the motor M17. As a result, the slider 924 is returned to the loading stage 31 of the loading section 3, together with the pallet 2. Then, at Step 18, the pallet 2 is transferred from the slider 924 to the loading stage 31. This transference of the pallet 2 will be described with reference to FIGS. 23A to 23D. First, as shown in FIG. 23A, the loading stage 31 is at a lowermost position. Then, as shown in FIG. 23B, the slider 924 holding the pallet 2 is moved in the positive Y-axial direction in the drawings to reach a position above the loading stage 31. After that, as shown in FIG. 23C, the loading stage 31 is moved upward to come into contact with the underside of the pallet 2. Then, the vacuum suction pump P1 of the loading stage 31 starts sucking, while the vacuum suction pump P20 of the unloading stage 41 stops sucking. As shown in FIG. 23D, the loading stage 31 is further moved upward to allow the slider 924 to leave the underside of the pallet 2, and thus, the slider 924 is further retired in the negative Y-axial direction so as to return to an initial position.

As described above, in the component mounting apparatus 1 according to this embodiment, LCD boards 101 held by pallet 2 are carried to the loading section 3 followed by the ACF applying section 5, the first intermediate stage 94A, the pre-press bonding section 6, the second intermediate stage 94B, the final press bonding section 7, and the unloading section 4 in this order. Therefore, a load on the LCD boards 101 is reduced, and consequently, damage to the LCD boards 101, which would be caused by a load applied during a course of carriage, can be prevented. Further, since the LCD boards 101 are held by the pallet 2, time required for recognizing the LCD boards 101 in each of the ACF applying section 5, the pre-press bonding section 6, and the final press bonding section 7 can be saved or eliminated to thereby improve tact. Furthermore, since the loading section 3, the ACF applying section 5, the first intermediate stage 94A, the pre-press bonding section 6, the second intermediate stage 94B, the final press bonding section 7 and the unloading section 4 are arranged on a straight line, there is no need for an operator to repeatedly move around the apparatus for inspection or maintenance. Thus, workability is improved.

Figure 24:
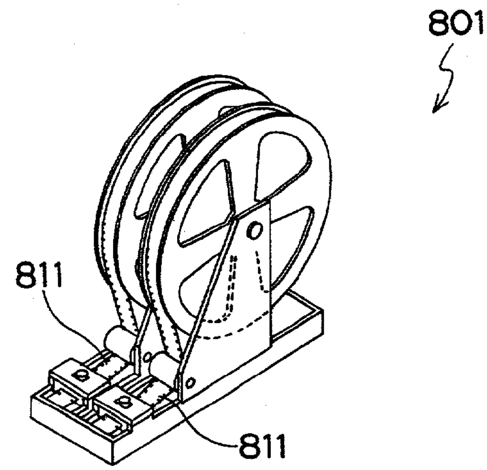
FIG. 24 is a perspective view of a TCP reel feeding mechanism.
Figure 25:
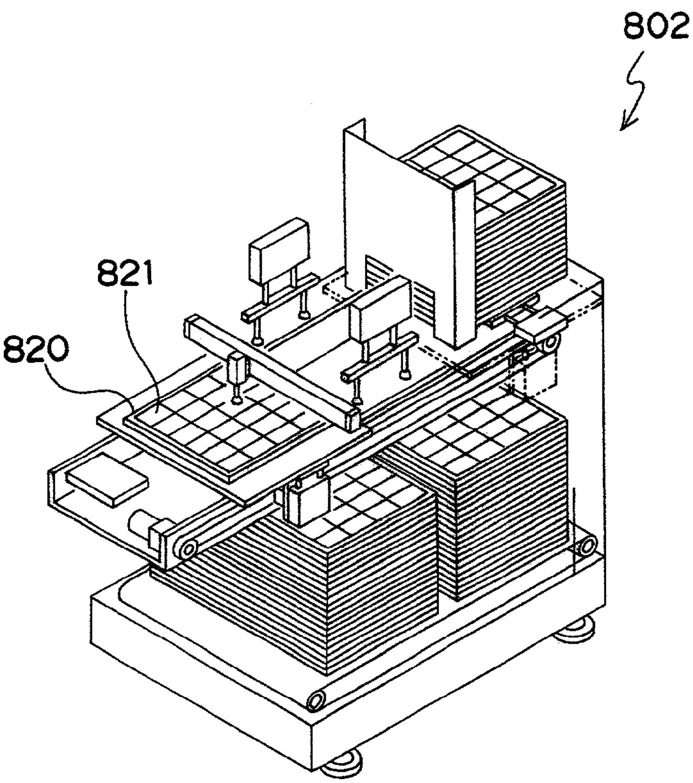
FIG. 25 is a perspective view of a FPC blister feeding mechanism.
Figure 26A:
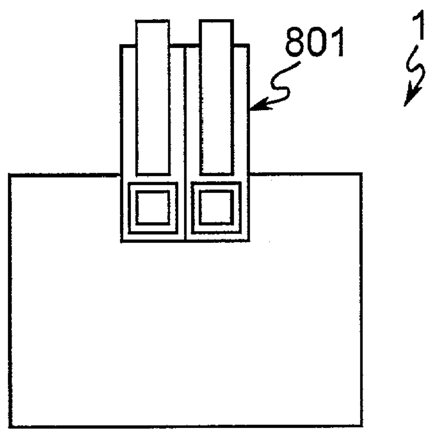
FIGS. 26A to 26D are schematic plan views illustrating other examples of a component feeding system.
Figure 26B:
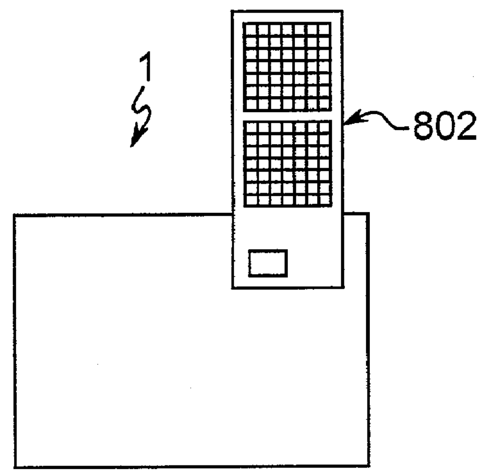
Figure 26C:
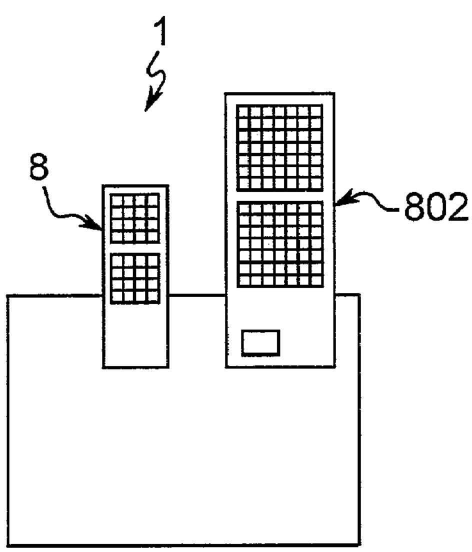
Figure 26D:
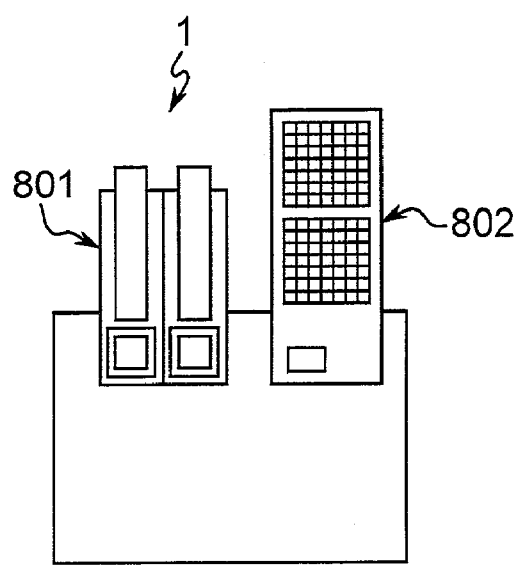

In the foregoing embodiment, the IC chip feeding mechanism 8 which feeds IC chips 102 to LCD boards 101 and mounts the IC chips 102 thereon is employed. However, a TCP reel feeding mechanism 801 which feeds components using a tape carrier package TCP as shown in FIG. 24, or an FPC blister feeding mechanism 802 which feeds, as components, FPC substrates 821 stocked in trays 820 as shown in FIG. 25 may be employed instead of, or together with, the IC chip feeding mechanism 8. FIGS. 26A to 26D show other examples of a component feeding system. FIG. 26A illustrates a component feeding system consisting of a TCP reel feeding mechanism 801; FIG. 26B illustrates a component feeding system consisting of an FPC blister feeding mechanism 802; FIG. 26C illustrates a component feeding system comprising an IC chip feeding mechanism 8 and an FPC blister feeding mechanism 802; and FIG. 26D illustrates a component feeding system comprising a TCP reel feeding mechanism 801 and an FPC blister feeding mechanism 802. Possible components to be mounted on boards by the component mounting apparatus of the present invention are electronic components such as IC chips 102, a variety of semiconductor devices, FPC boards or the like, and components other than electronic components.

In the foregoing embodiment, LCD boards 101 are used for mounting components thereon, however, there is no particular limit in selection of a type of boards. That is, other glass boards such as plasma display panel (PDP) boards, and other boards such as flexible printed boards (FPC boards) may be used. Furthermore, by operating the mechanical valves 202A to 202D with the air cylinders 302A to 302D and 402A to 402D of the loading section 3 and the unloading section 4, boards can be selectively held onto the plurality of the sucking sections 23A to 23D of the pallet 2. Therefore, boards having a variety of shapes and sizes can be held onto the pallet 2.

As described above, according to the component mounting apparatus of the present invention, there is no particular limit in terms of selection of both components and boards. Therefore, as shown in FIGS. 27A to 29D, it is possible to mount various types of components onto various types of boards.

Figure 27A:
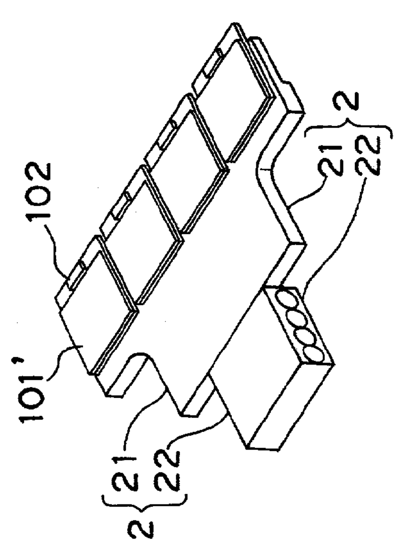
FIGS. 27A to 27D are perspective views illustrating examples of an arrangement of boards on pallets, wherein the boards are LCD boards and components are IC chips.
Figure 27B:
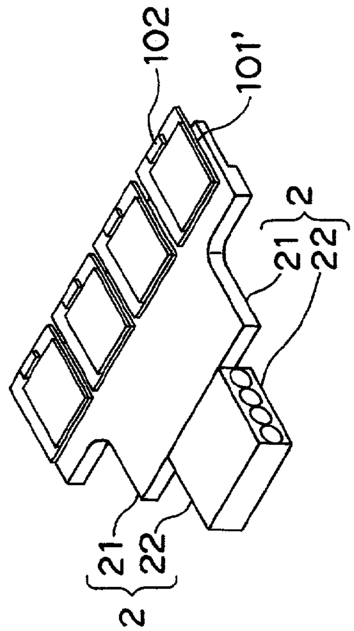
Figure 27C:
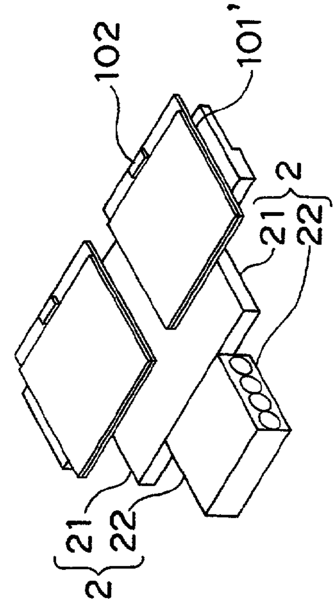
Figure 27D:
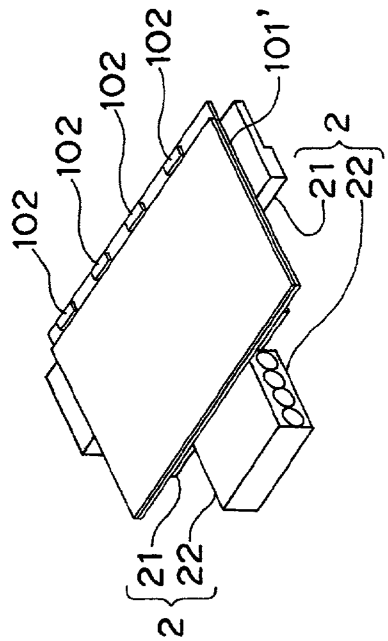

FIGS. 27A to 27D show several examples of mounting IC chips 102 onto glass boards 101'. In FIG. 27A, IC chips 102 are mounted on four glass boards 101' held on a pallet 2. An example shown in FIG. 27B is substantially the same as that shown in FIG. 27A, except that each of the glass boards 101' is provided with two electrodes orthogonal to each other. In FIG. 27C, IC chips 102 are mounted onto two relatively large glass boards 101' held on a pallet 2, respectively. In FIG. 27D, a plurality of IC chips 102 are mounted onto a large glass board 101'.

Figure 28B:
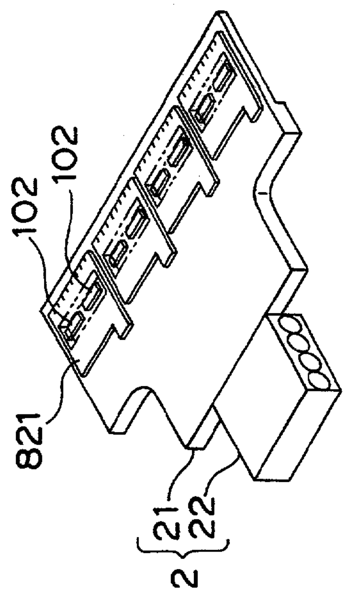
Figure 28C:
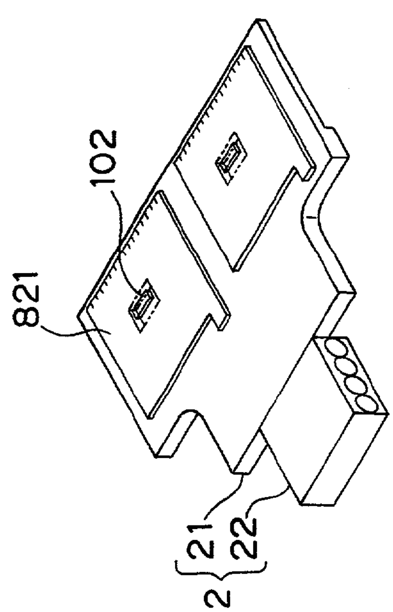
Figure 28D:
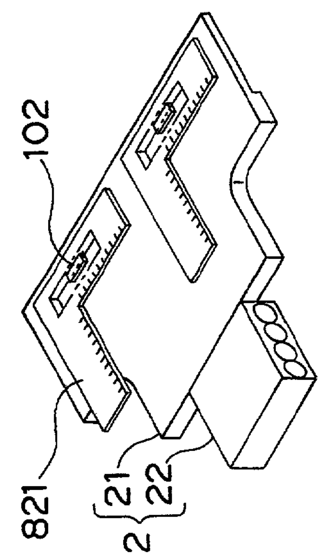

FIGS. 28A to 28D show several examples of mounting IC chips 102 onto FPC boards 821. In FIG. 28A, IC chips 102 are mounted onto four FPC boards 821 held on a pallet 2. An example shown in FIG. 28B is substantially the same as that shown in FIG. 28A, except that each of FPC boards 821 is provided with two IC chips. In FIG. 28C, IC chips 102 are mounted on two relatively large FPC boards 821 held on a pallet 2. In FIG. 28D, IC chips 102 are mounted on two L-shaped FPC boards 821.

Figure 29A:
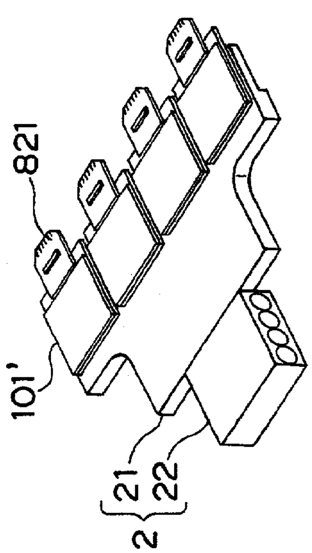
FIGS. 29A to 29D are perspective views illustrating examples of an arrangement of boards on pallets, wherein the boards are LCD boards and components are FPC boards.
Figure 29B:
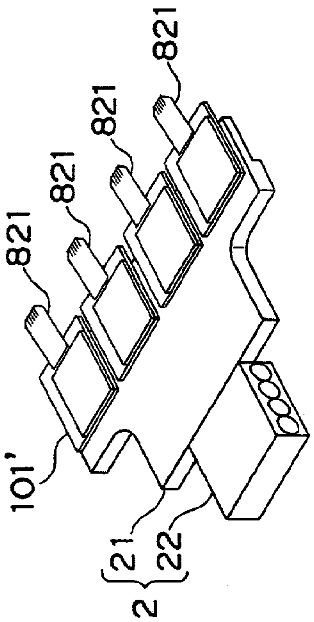
Figure 29C:
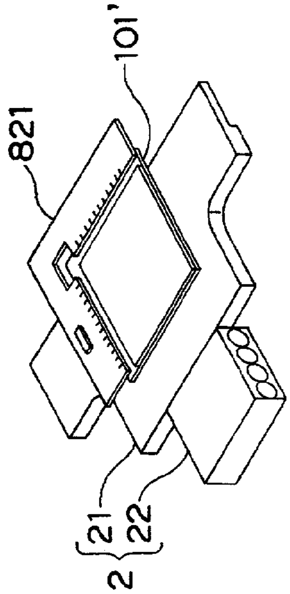
Figure 29D:
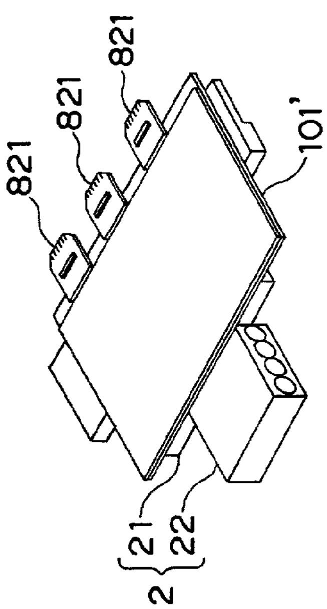

FIGS. 29A to 29D show several examples of mounting FPC boards 821, as components, onto glass boards 101'. In FIG. 29A, FPC boards 821 are mounted on four glass boards 101' held on a pallet 2. An example shown in FIG. 29B is substantially the same as that shown in FIG. 29A, except that each of glass boards 101' is provided with two electrodes orthogonal to each other. In FIG. 29C, a relatively large FPC board 821 provided with two electrodes is mounted onto a relatively large glass board 101' provided with two electrodes. In FIG. 29D, a plurality of FPC boards 821 is mounted onto a relatively large glass board 101'.

Figure 30A:
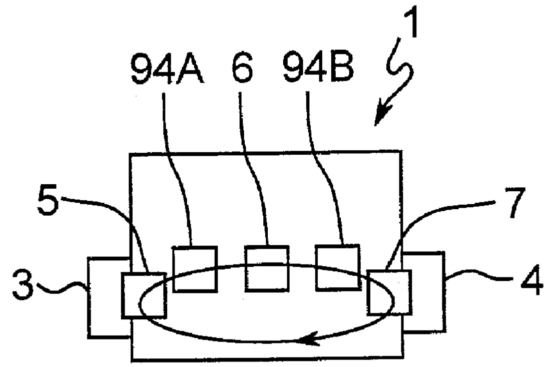
FIGS. 30A to 30C are schematic plan views illustrating examples of a board feeding system.
Figure 30B:
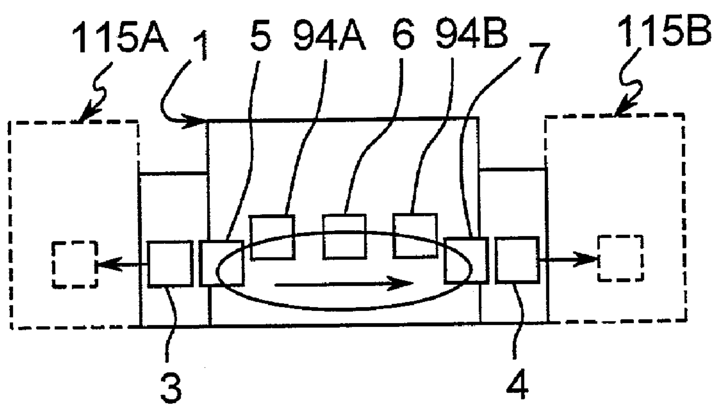
Figure 30C:
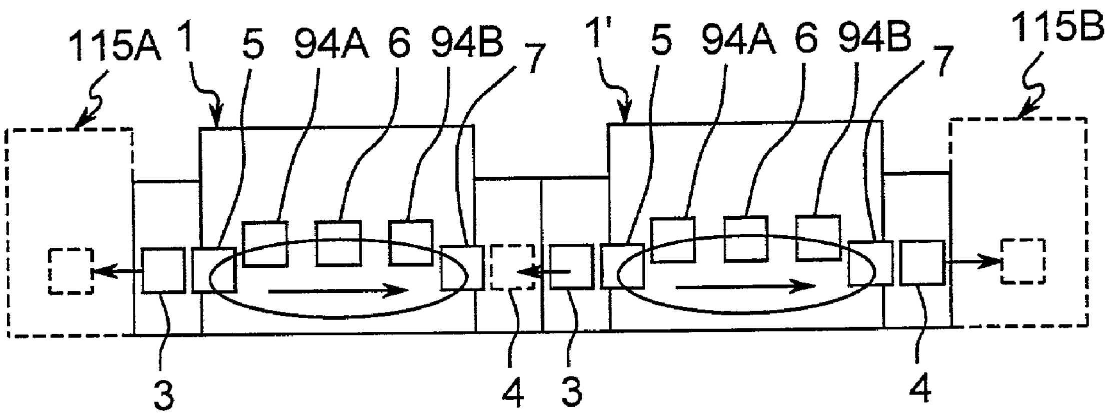

In the foregoing embodiment, one component mounting apparatus 1 is singly used as shown in FIG. 30A. Otherwise, as shown in FIG. 30B, other apparatuses 115A, 115B may be respectively arranged on an upstream side and a downstream side of the component mounting apparatus 1. In this arrangement, after mounting components onto boards, fed from the apparatus 115A, in the component mounting apparatus 1, the boards are fed to the apparatus 115B. Further, as shown in FIG. 30C, two component mounting apparatuses 1 and 1' according to the present embodiment may be combined with each other. Furthermore, other apparatuses 115A, 115B may be respectively arranged on an upstream side and a downstream side of the two component mounting apparatuses.

Figure 31:
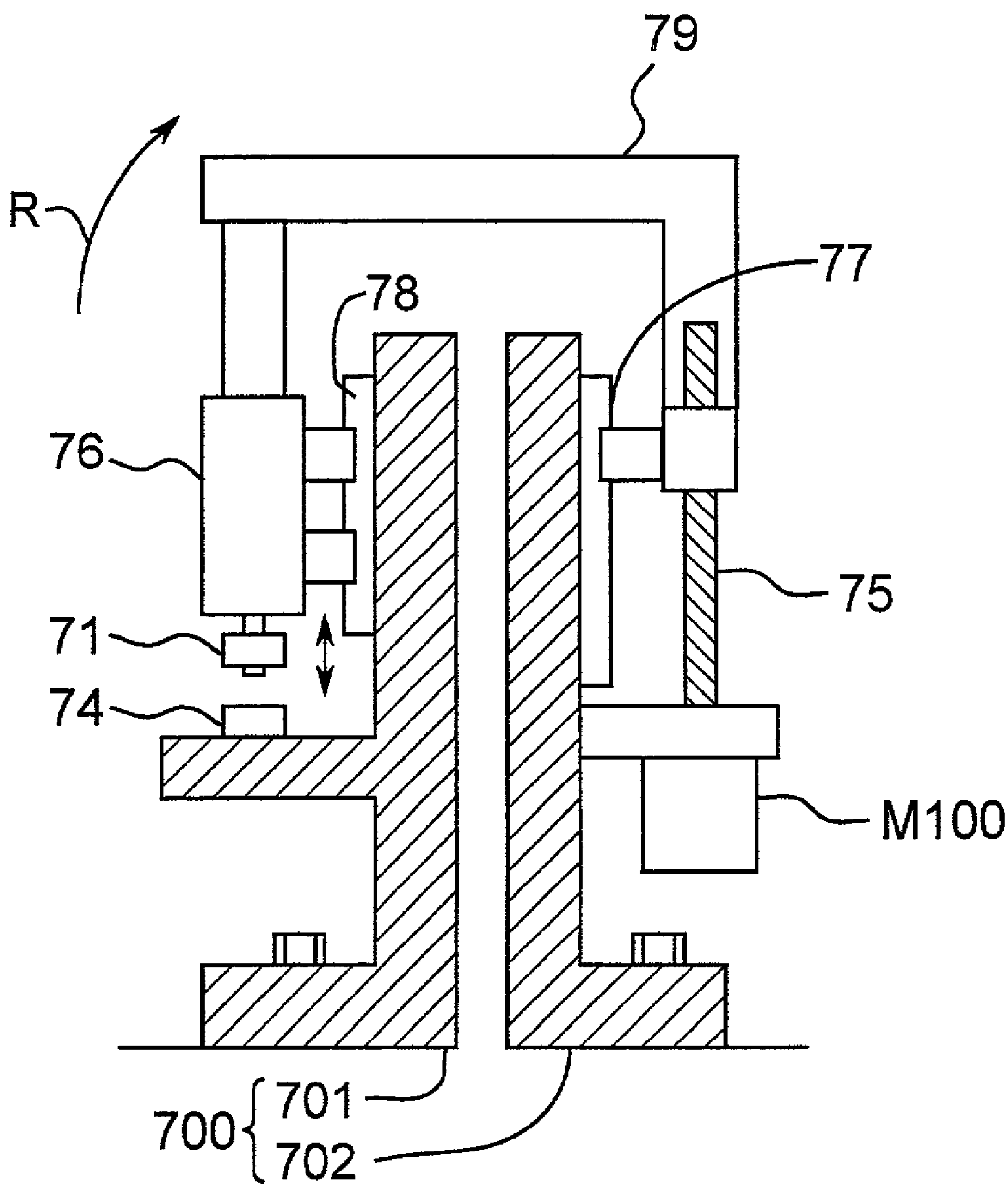
FIG. 31 is a schematic longitudinal sectional view of an example of a frame structure of a final press bonding section.

In case where a cast product is used as the frame of the final press bonding section 7 of the above component mounting apparatus 1, it is preferable that the frame has a structure as schematically shown in FIG. 31. Specifically, frame 700 of the final press bonding section 7 comprises a first section 701 and a second section 702 separated from each other. The first section 701 comprises a head 76 provided with a heating-pressing tool 71 and a backup tool 74. The head 76 is so supported on the first section 701 as to be moved up and down by a linear guide 78. On the other hand, a motor M100 is fixed on the second section 702. An output shaft of the motor M100 is combined with a vertically extending threaded shaft 75. The threaded shaft 75 is screwed to a proximal end portion of an arm 79 which is so supported on the second section 702 as to be moved up and down by a linear guide 77, while a distal end portion of the arm 79 is combined with the head 76. Accordingly, the heating-pressing tool 71 is moved up and down in accordance with a rotating direction of the motor M100.

In the frame 700 having the above structure, a reaction force caused in the heating-pressing tool 71, indicated by arrow R, mainly acts on the second section 702, when a board and component are pressed; that is, when the board and the component are held between the heating-pressing tool 71 and the backup tool 74. Therefore, it is possible to prevent a dislocation in position or a parallel degree of the head 76 and the heating-pressing tool 71 of the first section 701, while the board and the component are being pressed. In this regard, it is also possible to employ the same structure as above for the pre-press bonding section 6 to thereby prevent such a dislocation in position of the pre-press bonding head 62 that may be caused by a bending of a cast frame.

Figure 32:
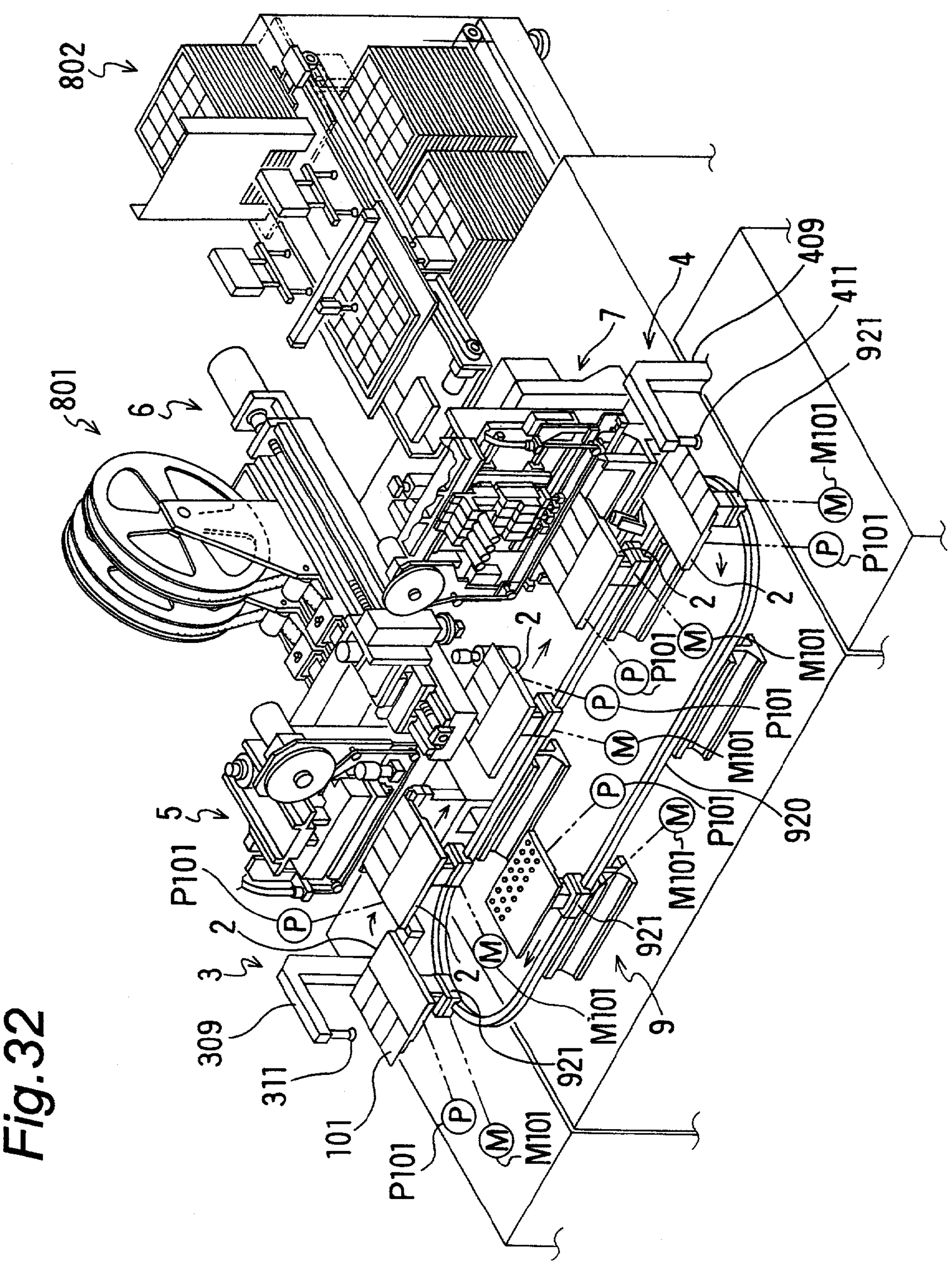
FIG. 32 is a perspective view of a component mounting apparatus according to a modification of the present invention.

A component mounting apparatus shown in FIG. 32, according to another embodiment of the present invention differs from the foregoing embodiment in terms of structure of the pallet carrying section 9. In this modification, a guide rail 920 having a track-like configuration viewed from above is provided. The guide rail 920 has one circular portion positioned at the loading section 3 and another circular portion positioned at the unloading section 4. Further, the guide rail 920 has one linear portion which extends along the AFC applying unit 5, the pre-press bonding section 6 and the final press bonding section 7, and thus constitutes a forward path. Another linear portion of the guide rail 920 constitutes a backward path that extends from the unloading section 4 to the loading section 3. Arranged on the guide rail 920 are six automatic carrying mechanisms 921 driven by a motor M101. A pallet 2 is fixed on each of the carrying mechanisms 921, and a vacuum suction pump P101 for sucking and holding a board 101 onto the pallet 2 is provided on each of the carrying mechanisms 921.

In the component mounting apparatus shown in FIG. 32, after boards are fed to a pallet of the carrying mechanism 921 in the loading section 3, the carrying mechanism 921 travels on the guide rail 920 to the ACF applying section 5, the pre-press bonding section 6 and the final press bonding section 7 in this order. After the carrying mechanism 921 reaches the unloading section 4, board 101 is carried out from the apparatus, and then, the carrying mechanism 921 travels on the guide rail 920 to return to the loading section 3.

Since other structures and operations of the component mounting apparatus shown in FIG. 32 are substantially the same as those of the component mounting apparatus according to the foregoing embodiment shown in FIG. 1, the same elements are denoted by the same reference numerals so as to abbreviate descriptions thereof.

The scope of the present invention is not limited by the foregoing embodiments in any way, and various modifications thereof are, of course, possible. For example, holding mechanisms using mechanical chucks can be employed instead of the vacuum suction pumps for sucking and holding the components and the boards in the foregoing embodiments. Further, the actuators for use in carrying or elevating elements may be any of electrical motors and air cylinders.

The present invention has been perfectly described with reference to the accompanying drawings; however, it is obvious to those skilled in the art that various alterations and modifications are possible. Therefore, it should be construed that such alterations and such modifications are also included in the present invention, in so far as they are not beyond the spirit and the scope of the present invention.

What is claimed is:

1. An apparatus for mounting a component onto a board, comprising:

a pallet having a holding mechanism for releasably sucking and holding a board, said pallet comprising a pallet body for receiving the board at an upper face of said pallet body, and said holding mechanism comprising (i) suction holes for sucking and holding the board, first and second suction ports, and an exhaust port for communicating with air, formed in said pallet body, and (ii) a valve unit for allowing said suction holes to communicate with said first and second suction ports, or said exhaust port;

a loading section for feeding the board to said pallet such that the board is to be sucked and held by said holding mechanism, said loading section including a first switching mechanism for switching said valve unit so as to allow said suction holes to communicate with said first and second suction ports;

an adhesive applying section for applying adhesive onto the board;

a pre-press bonding section for aligning a component with the board and pressing the component onto the board with a first pressing force;

a final press bonding section for pressing the component onto a placement section of the board with a second pressing force larger than the first pressing force, so as to fix the component onto the placement section of the board;

an unloading section for stopping said holding mechanism from sucking the board so as to allow the board, with the component mounted thereon, to be removed from said pallet, said unloading section including a second switching mechanism for switching said valve unit so as to allow said first and second suction ports to communicate with said exhaust port; and a pallet carrying section having a forward carrying section for carrying said pallet from said loading section to said adhesive applying section, said pre-press bonding section, said final press bonding section, and said unloading section in this order with the board being held on said pallet, and a backward carrying section for returning said pallet from said unloading section to said loading section, said forward carrying section comprising (i) a first intermediate stage arranged between said adhesive applying section and said pre-press bonding section, said first intermediate stage including a sucking mechanism for sucking and holding said pallet, and a suction source to be connected to said first suction port, (ii) a second intermediate stage arranged between said pre-press bonding section and said final press bonding section, said second intermediate stage including a sucking mechanism for sucking and holding said pallet, and a suction source to be connected to said first suction port, (iii) a first carrying mechanism for carrying said pallet from said loading section to said first intermediate stage via said adhesive applying section, and placing said pallet on said first intermediate stage, said first carrying mechanism including a suction mechanism for sucking and holding said pallet, and a suction source to be connected to said second suction port, (iv) a second carrying mechanism for carrying said pallet from said first intermediate stage to said second intermediate stage via said pre-press bonding section, and placing said pallet on said second intermediate stage said second carrying mechanism including a suction mechanism for sucking and holding said pallet, and a suction source to be connected to said second suction port, and (v) a third carrying mechanism for carrying said pallet from said second intermediate stage to said unloading section via said final press bonding section, said third carrying mechanism including a suction mechanism for sucking and holding said pallet, and a suction source to be connected to said second suction port, wherein said loading section, said adhesive applying section, said pre-press bonding section, said final press bonding section, and said unloading section are linearly arranged.

2. The apparatus according to claim 1, wherein said pallet body includes a check valve arranged between said first and second suction ports and said suction holes, with said check valve being for only permitting air to flow from said suction holes to said first and second suction ports.

3. The apparatus according to claim 1, wherein said loading section comprises a loading stage onto which said pallet is to be placed, and a board carry-in mechanism for carrying the board from outside the apparatus onto said pallet when said pallet is on said loading stage.

4. The apparatus according to claim 3, wherein said loading stage comprises a sucking mechanism for sucking and holding said pallet, and a suction source to be connected to said first suction port.

5. The apparatus according to claim 3, wherein said board carry-in mechanism comprises a carry-in slider for carrying the board into the apparatus from outside the apparatus, and a loader for transferring the board from said carry-in slider to said pallet when said pallet is on said loading stage.

6. The apparatus according to claim 5, wherein said unloading section comprises an unloading stage onto which said pallet is to be placed, and a board carry-out mechanism for carrying the board from said pallet, when said pallet is on said unloading stage, to outside the apparatus.

7. The apparatus according to claim 6, wherein said unloading stage comprises a suction mechanism for sucking and holding said pallet, and a suction source to be connected to said first suction port.

8. The apparatus according to claim 6, wherein said board carry-out mechanism comprises a carry-out slider for carrying the board from the apparatus to outside the apparatus, and an unloader for transferring the board from said pallet, when said pallet is on unloading stage, to said carry-out slider.

* * * * *

UNITED STATES PATENT AND TRADEMARK OFFICE

CERTIFICATE OF CORRECTION

PATENT NO. : 7,021,357 B2
APPLICATION NO. : 10/234118
DATED : April 4, 2006
INVENTOR(S) : Ryoichiro Katano et al.

It is certified that error appears in the above-identified patent and that said Letters Patent is hereby corrected as shown below:

In column 21, line 45, please replace “stage said” with --stage,said--.

Signed and Sealed this

Seventeenth Day of October, 2006

JON W. DUDAS
*Director of the United States Patent and Trademark Office*